United States Patent
Lu et al.

(10) Patent No.: US 12,543,322 B2
(45) Date of Patent: Feb. 3, 2026

(54) FERROELECTRIC MEMORY DEVICE WITH CARRIER STRUCTURES

(71) Applicant: TAIWAN SEMICONDUCTOR MANUFACTURING COMPANY, LTD., Hsinchu (TW)

(72) Inventors: Wen-Ling Lu, Hsinchu (TW); Chia-En Huang, Hsinchu (TW); Ya-Yun Cheng, Hsinchu (TW); Yi-Ching Liu, Hsinchu (TW); Huan-Sheng Wei, Hsinchu (TW); Chung-Wei Wu, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 918 days.

(21) Appl. No.: 17/669,802

(22) Filed: Feb. 11, 2022

(65) Prior Publication Data
US 2023/0262986 A1    Aug. 17, 2023

(51) Int. Cl.
| | |
|---|---|
| *H01L 23/498* | (2006.01) |
| *G11C 5/06* | (2006.01) |
| *H01L 21/768* | (2006.01) |
| *H01L 23/00* | (2006.01) |
| *H01L 23/495* | (2006.01) |
| *H10B 51/10* | (2023.01) |
| *H10B 51/20* | (2023.01) |

(Continued)

(52) U.S. Cl.
CPC ............. *H10B 51/20* (2023.02); *G11C 5/063* (2013.01); *H01L 21/76802* (2013.01); *H10B 51/10* (2023.02)

(58) Field of Classification Search
CPC ............. H10D 64/689; H10D 30/0415; G11C 11/223; G11C 14/0027; G11C 11/22; H10B 51/20; H10B 51/10–30
See application file for complete search history.

(56) References Cited

U.S. PATENT DOCUMENTS 11,145,676 B1 * 10/2021 Chiang ............... G11C 11/1673
11,527,552 B2 * 12/2022 Lu ........................ H10D 64/689
(Continued)

*Primary Examiner* — Wael M Fahmy
*Assistant Examiner* — Aneesa Riaz Baig
(74) *Attorney, Agent, or Firm* — Birch, Stewart, Kolasch & Birch, LLP

(57) ABSTRACT

A ferroelectric memory device includes a semiconductor structure, a stack structure disposed on the semiconductor structure and including multiple dielectric layers and multiple conductive layers that are alternatingly stacked, and multiple memory arrays extending through the stack structure. Each of the memory arrays includes two spaced-apart memory segments connecting to the stack structure, multiple spaced-apart channel portions each being connected to a corresponding one of the memory segments, and multiple pairs of source/bit lines that are spaced apart from each other. Each of the pairs of the source/bit lines is connected between corresponding two of the channel portions. The ferroelectric memory device further includes multiple carrier structures each being connected to one of the source/bit lines in a corresponding one of the pairs of the source/bit lines, and being separated from the other one of the source/bit lines in the corresponding one of the pairs of the source/bit lines.

20 Claims, 19 Drawing Sheets

(51) Int. Cl.
      *H10H 20/852*       (2025.01)
      *H10H 20/857*       (2025.01)

(56) References Cited

U.S. PATENT DOCUMENTS

| | | | | |
|---|---|---|---|---|
| 11,710,790 | B2* | 7/2023 | Chiang | H10D 30/701 |
| | | | | 257/295 |
| 2019/0348424 | A1* | 11/2019 | Karda | H10B 51/20 |
| 2021/0126013 | A1* | 4/2021 | Lai | H10D 30/025 |
| 2021/0335820 | A1* | 10/2021 | Kang | H10B 51/10 |
| 2021/0375888 | A1* | 12/2021 | Lu | H10D 30/6755 |
| 2021/0375932 | A1* | 12/2021 | Wang | H10D 30/6734 |
| 2021/0408046 | A1* | 12/2021 | Chang | G11C 11/2255 |
| 2022/0020775 | A1* | 1/2022 | Yang | H10B 51/20 |
| 2022/0037253 | A1* | 2/2022 | Yang | H10B 43/20 |
| 2022/0037362 | A1* | 2/2022 | Lin | H10B 51/20 |
| 2022/0216236 | A1* | 7/2022 | Lin | H01L 23/5226 |
| 2023/0077181 | A1* | 3/2023 | Petti | H10D 30/6755 |
| 2023/0078883 | A1* | 3/2023 | Chien | H10B 51/40 |
| | | | | 257/295 |
| 2023/0165012 | A1* | 5/2023 | Nam | H10D 64/689 |
| | | | | 257/295 |
| 2023/0262986 | A1* | 8/2023 | Lu | H10B 51/20 |
| | | | | 257/295 |
| 2023/0413571 | A1* | 12/2023 | Lu | H10B 51/10 |
| 2024/0381652 | A1* | 11/2024 | Yeong | G11C 11/223 |

* cited by examiner

FERROELECTRIC MEMORY DEVICE WITH CARRIER STRUCTURES

BACKGROUND

Currently, memory devices are widely used in various fields, such as cloud storage, medical industry, transportation, mobile devices, etc. Modern memory devices may be classified as volatile memory and non-volatile memory, where volatile memory can store data when powered while non-volatile memory is capable of retaining stored data even when not powered. Ferroelectric random-access memory (FeRAM) devices have advantages such as low power consumption, fast writing, superior read/write endurance, etc.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
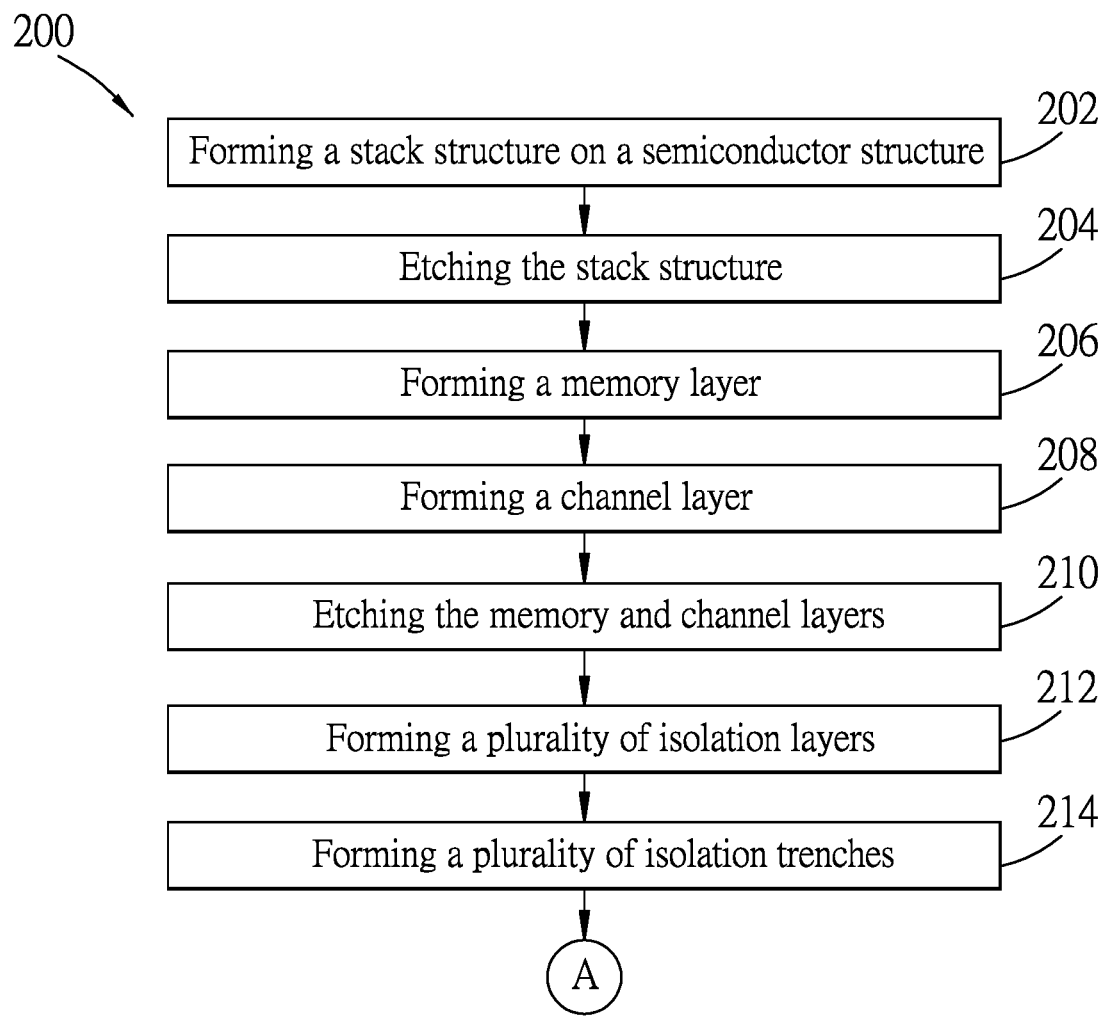
FIGS. 1A and 1B illustrate a method for manufacturing a ferroelectric memory device in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "on," "above," "over," "downwardly," "upwardly," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Figure 1B:
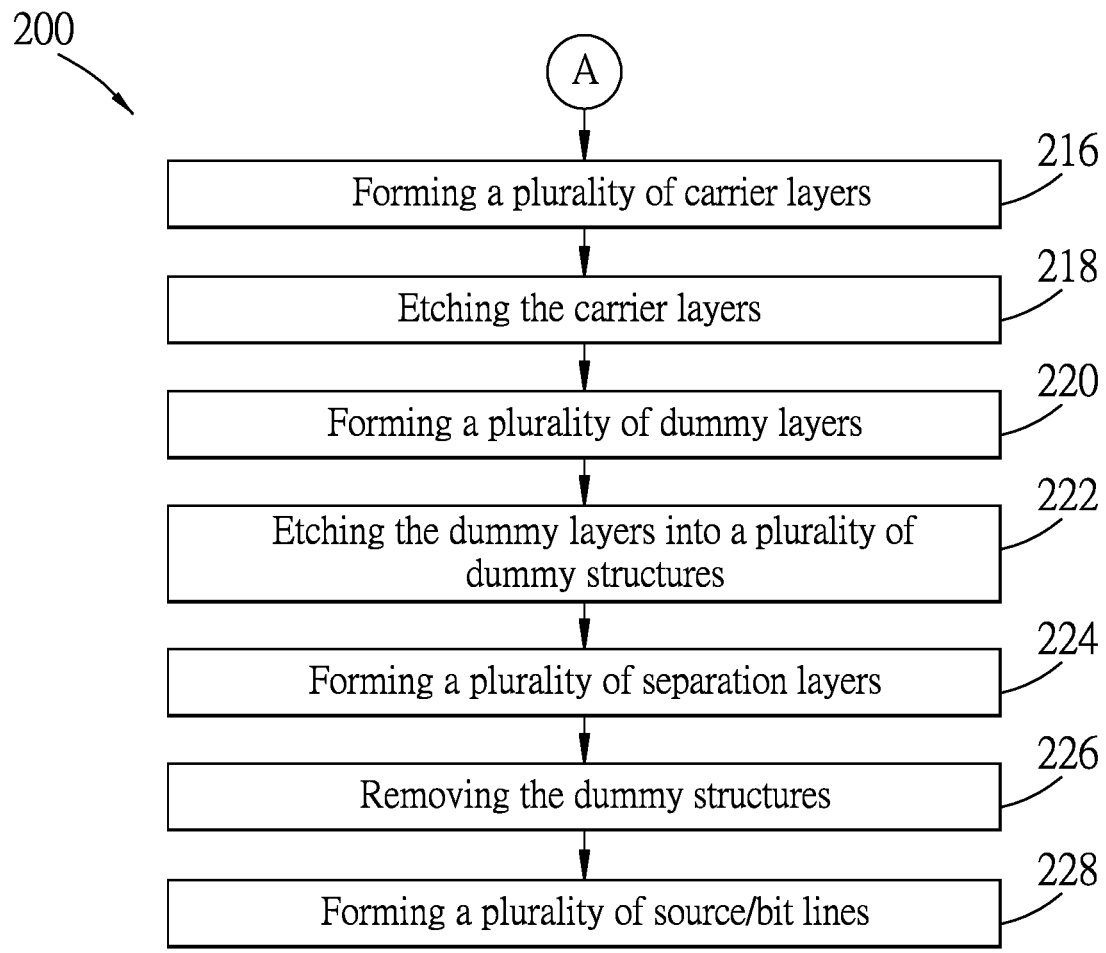

FIGS. 1A and 1B illustrates a method 200 for manufacturing a ferroelectric memory device 300 (see FIG. 26) in accordance with some embodiments. FIGS. 2 to 27 are schematic views showing intermediate stages of the method 200 as depicted in FIG. 1. Additional steps which are not limited to those described in the method 200, can be provided before, during or after manufacturing of the ferroelectric memory device 300, and some of the steps described herein may be replaced by other steps or be eliminated. Similarly, additional features may be present in the ferroelectric memory device 300, and/or features present may be replaced or eliminated in additional embodiments.

Figure 2:
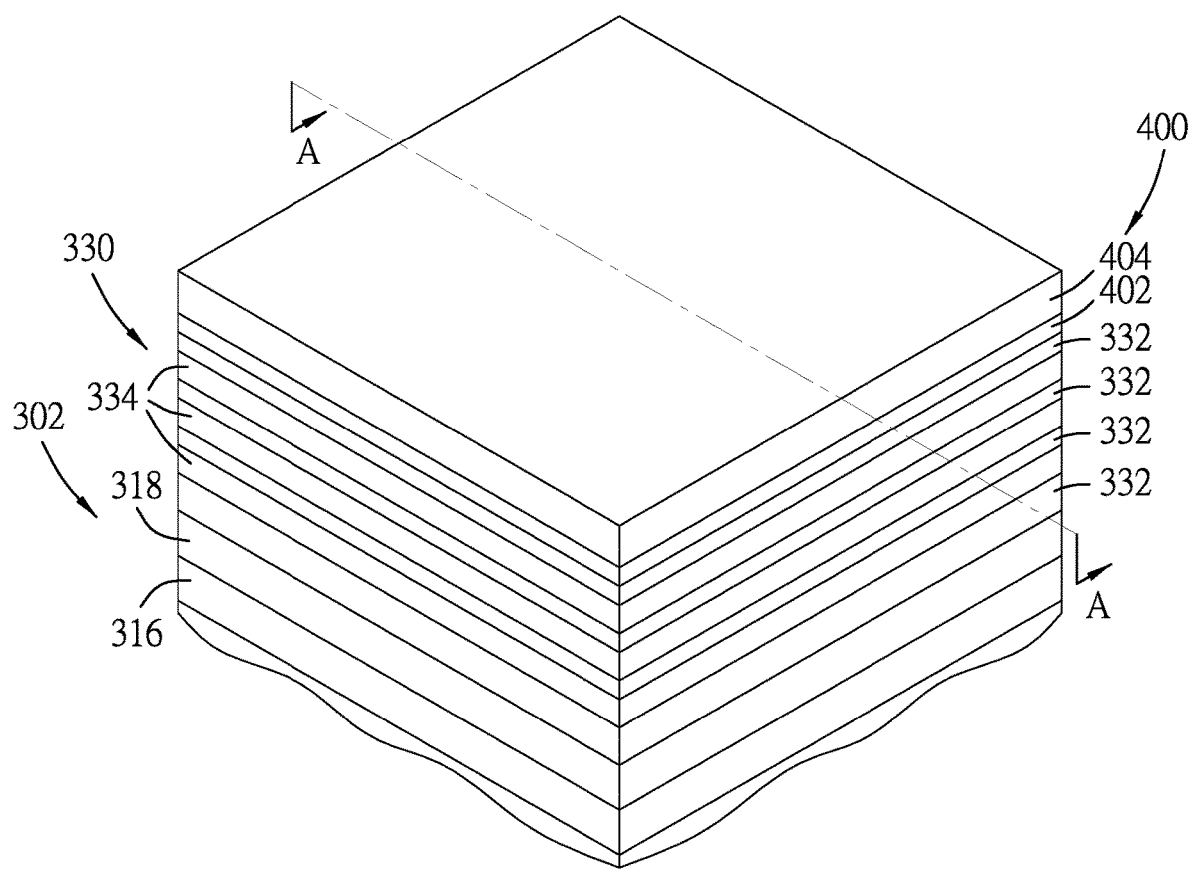
FIGS. 2 to 27 are schematic views showing intermediate steps of a method for manufacturing a ferroelectric memory device in accordance with some embodiments.
Figure 3:
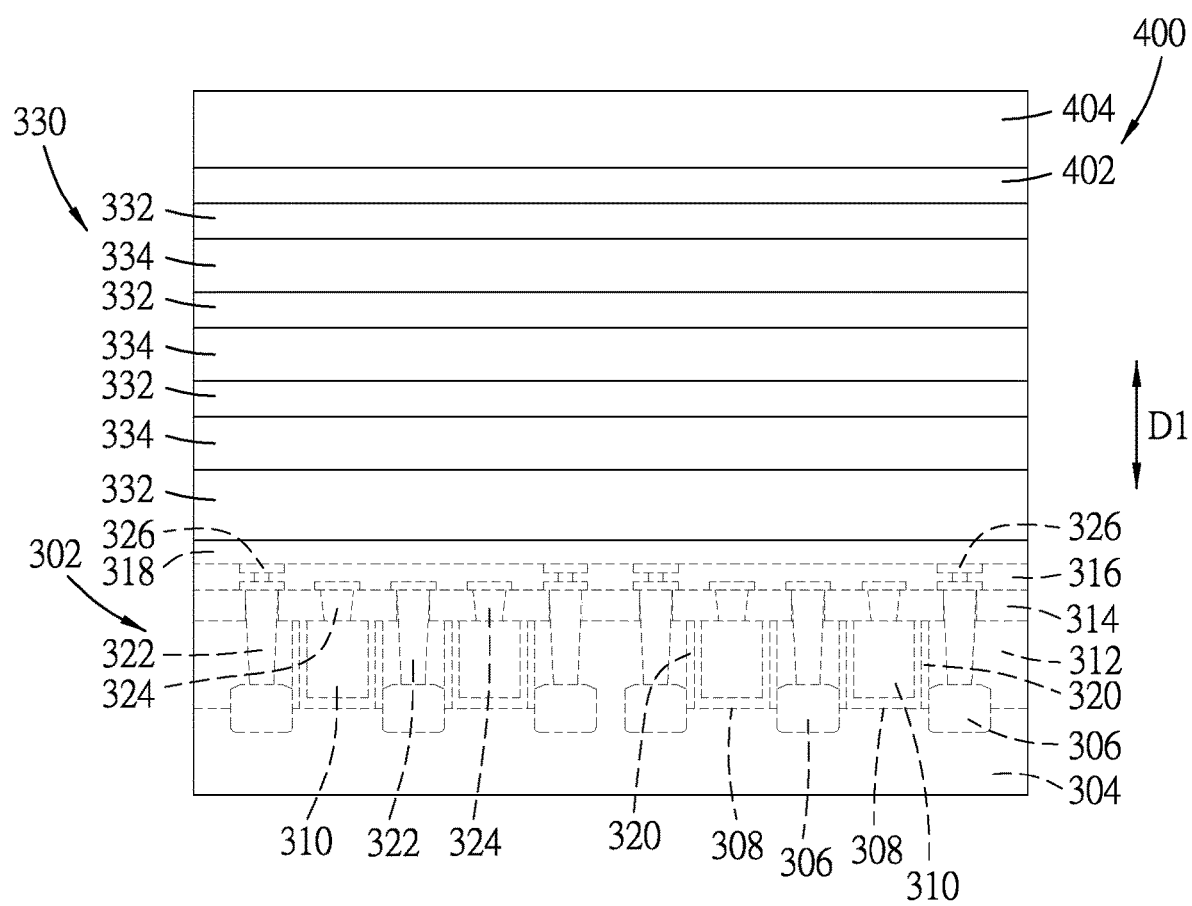

Referring to FIG. 1A, the method 200 begins at block 202, where a stack structure is formed on a semiconductor structure. Referring to the example illustrated in FIGS. 2 and 3, where FIG. 2 is a schematic perspective view showing the stack structure 330 formed on the semiconductor structure 302, and FIG. 3 is a schematic sectional view taken along line A-A of FIG. 2. Detailed structures of the semiconductor structure 302 are only schematically shown in FIG. 3 and are omitted in other figures for the sake of brevity. In some embodiments, the semiconductor structure 302 may include a semiconductor substrate 304, a plurality of source/drain regions 306, a plurality of gate electrodes 310 each surrounded by a gate dielectric layer 308, a plurality of spacers 320 that are formed on sidewalls of the gate dielectric layer 308, first to fourth interlayer dielectric (ILD) layers 312, 314, 316, 318, a plurality of source/drain contacts 322, a plurality of gate contacts 324, and a plurality of conductive features 326.

In some embodiments, the semiconductor substrate 304 may be a suitable substrate, such as an elemental semiconductor or a compound semiconductor. The elemental semiconductor may contain a single species of atom, such as Si, Ge or other suitable materials, e.g., other elements from column XIV of the periodic table. The compound semiconductor may be composed of at least two elements, such as GaAs, SiC, SiGe, GaP, InSb, InAs, InP, GaAsP, GaInP, GaInAs, AlGaAs, AlInAs, GaInAsP, or the like. In some embodiments, the semiconductor substrate 304 may be a semiconductor-on-insulator (SOI) substrate, such as silicon germanium-on-insulator (SGOI) substrate, or the like. In some embodiments, an SOI substrate may include an epitaxially grown semiconductor layer, such as Si, Ge, SiGe, any combination thereof, or the like, which is formed over an oxide layer. In some embodiments, the source/drain regions 306 may be formed in the semiconductor substrate 304 or may partially extend above the semiconductor substrate 304. The source/drain regions 306 may be made of silicon carbide (SiC), silicon phosphorous (SiP), phosphorous-doped silicon carbon (SiCP), other suitable materials, or any combination thereof for n-type semiconductor devices. The source/drain regions 306 may be made of silicon germanium (SiGe), other suitable materials, or any combination thereof, and may be doped with p-type impurities for p-type semiconductor devices. In some embodiments, the source/drain regions 306 may be formed by metal-organic CVD (MOCVD), liquid phase epitaxy (LPE), vapor phase epitaxy (VPE), molecular beam epitaxy (MBE), selective epitaxy growth (SEG), other suitable techniques, or any combination thereof. In some embodiments, the first ILD layer 312 may be disposed above the semiconductor substrate 304, and may be made of a material that includes silicon oxide, phosphosilicate glass (PSG), borosilicate glass (BSG), boron-doped phosphosilicate glass (BPSG), fluorine-doped silicate glass (FSG), other suitable materials, or any combination thereof. The first ILD layer 312 may be made by spin coating, chemical vapor deposition (CVD) (including flowable CVD (FCVD), plasma enhanced CVD (PECVD), low pressure CVD (LPCVD), etc.), other suitable techniques, or any combination thereof. The second to fourth ILD layers 314, 316, 318 may each be made of a material identical to or different from that of the first ILD layer 312, according to practical requirements. The spacers 320 are surrounded by the first ILD layer 312. In some embodiments, each of the spacers 320 may include multiple sub-layers (not shown) each being made of silicon oxide, silicon nitride, silicon oxynitride, other suitable materials, or any combination thereof, and each being made by CVD, physical vapor deposition (PVD), atomic layer deposition (ALD), other suitable techniques, or any combination thereof. In some embodiments, the gate dielectric layer 308 may be made of silicon oxide, silicon nitride, a high-k dielectric material, other suitable materials, or any combination thereof. In some embodiments, the high-k dielectric material may be a metal oxide or a silicate of Hf, Al, Ga, Ta, Gd, Y, Zr, La, Mg, Ba, Ti, Pb, other suitable materials, or any combination thereof. In some embodiments, the gate dielectric layer 308 may be formed to have any suitable values of thickness, and may be formed by ALD, PECVD, other suitable techniques, or any combination thereof. In some embodiments, the gate electrodes 310 may be made of W, Al, Ta, Ti, Ni, Cu, Co, other suitable materials, or any combination thereof. In some embodiments, the gate electrodes 310 may be formed by ALD, CVD, PVD, plating, other suitable techniques, or any combination thereof. In some embodiments, although not shown in FIG. 3, there may be multiple intermediate layers (not shown) between each of the gate electrodes 310 and a corresponding one of the gate dielectric layers 308, such as glue layers, work function material layers, etc., according to practical requirements. In some embodiments, the source/drain contacts 322 may extend through the first and second ILD layers 312, 314, and may be respectively and electrically connected to the source/drain regions 306. In some embodiments, the gate contacts 324 may extend through the second ILD layer 314, and may be respectively and electrically connected to the gate electrodes 310. In some embodiments, each of the source/drain contacts 322 and the gate contacts 324 may be made of tungsten or other suitable materials. The conductive features 326 may be formed in the third ILD layer 316, and may be used for rerouting the source/drain contacts 322 and/or gate contacts 324, or may be used for electrical connection with devices subsequently formed thereon. In some embodiments, the conductive features 326 may be made of Cu, Co, W, Ru, Mo, Al, other suitable materials, or any combination thereof. In some embodiments, the fourth ILD layer 318 may be a protection layer covering the conductive features 326, and may be made of a dielectric material, an insulating material, or other suitable materials.

As shown in FIGS. 2 and 3, the stack structure 330 may be formed on the semiconductor structure 302. In some embodiments, the stack structure 330 includes a plurality of dielectric layers 332 and a plurality of conductive layers 334 that are alternatingly stacked on the semiconductor structure 302 along a direction (D1) that may be substantially perpendicular to the semiconductor substrate 304. In some embodiments, the dielectric layers 332 may be made of silicon oxide, silicon nitride, silicon oxynitride, other suitable materials, or any combination thereof. In some embodiments, the dielectric layers 332 may be made by CVD, PVD, ALD, other suitable techniques, or any combination thereof. In some embodiments, the conductive layers 334 may be made of Al, Ru, W, Ta, TaN, Ti, TiN, Cu, other suitable materials, or any combination thereof. In some embodiments, the conductive layers 334 may be made by CVD, PVD, ALD, other suitable techniques, or any combination thereof. Although FIGS. 2 and 3 illustrate a specific number of the dielectric layers 332 and the conductive layers 334, the number of the dielectric layers 332 and the conductive layers 334 can be changed according to practical requirements. In addition, the vertical thickness and horizontal width of the dielectric layers 332 and the conductive layers 334 are also determined and changeable according to practical requirements.

Figure 4:
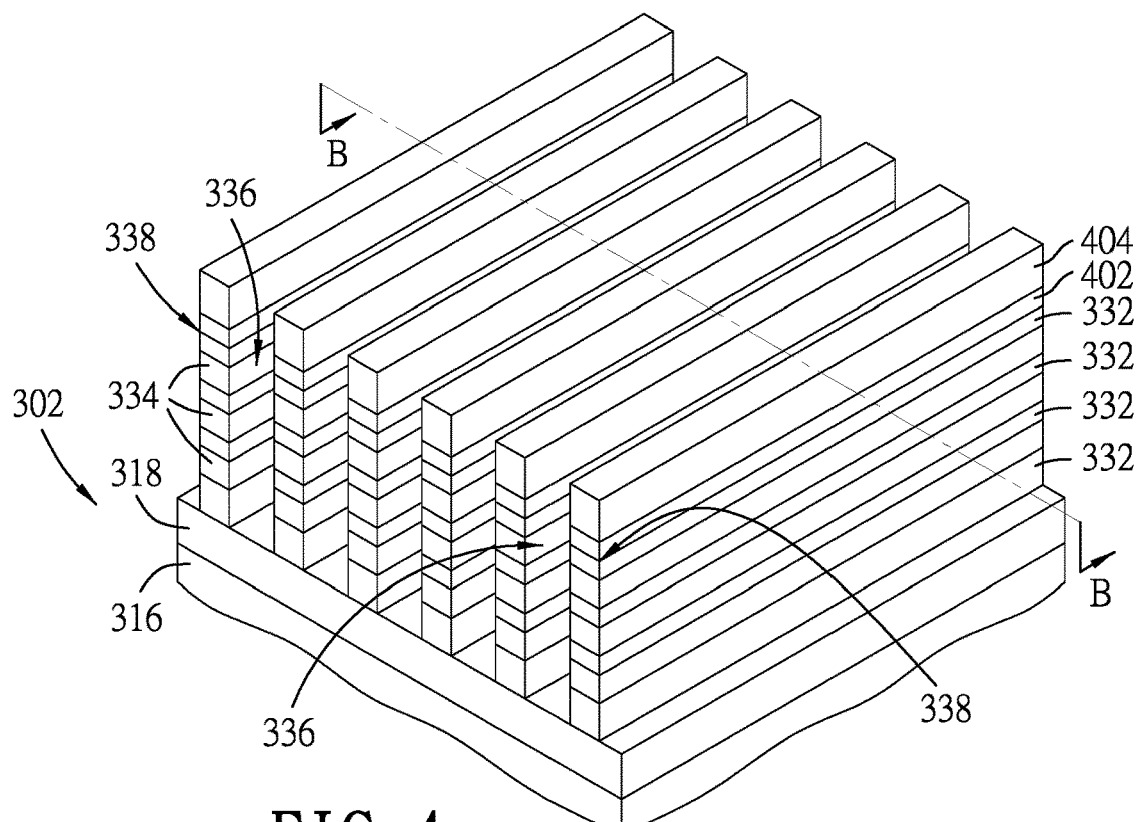
Figure 5:
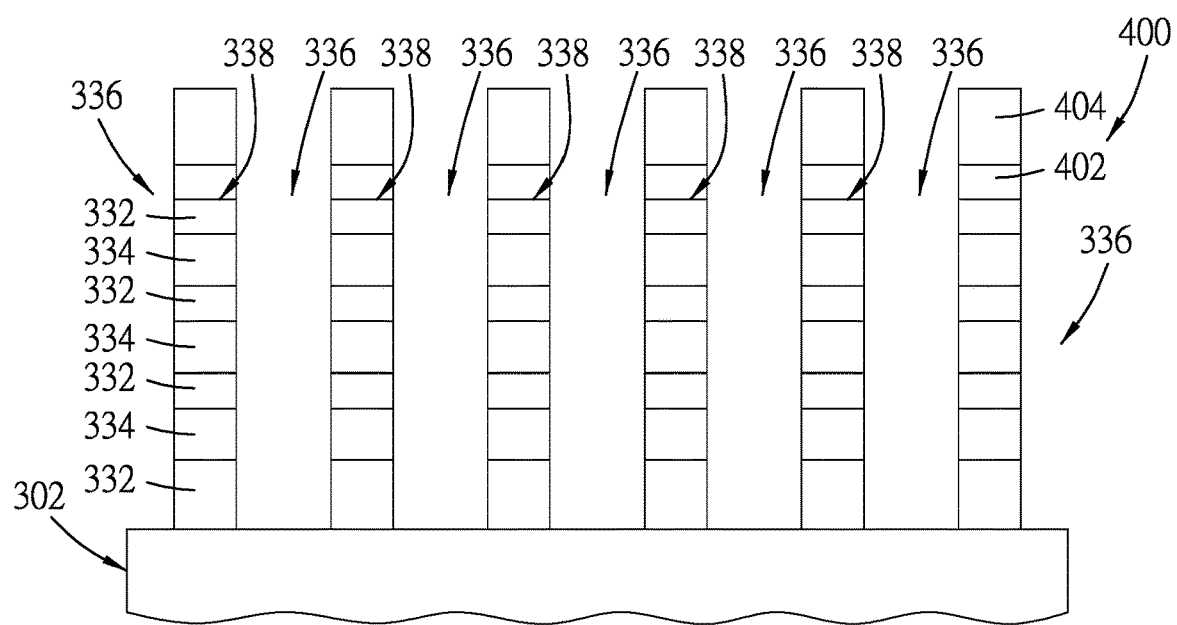

Referring to FIG. 1A, in a step 204 of the method 200, the stack structure 330 is etched. During the etching of the stack structure 330, a mask 400 (see FIGS. 2 and 3) is formed on the stack structure 330. In some embodiments, the mask 400 may include a pad oxide layer 402 and a pad nitride layer 404. In some embodiments, each of the pad oxide layer 402 and the pad nitride layer 404 may be made of CVD, ALD, other suitable techniques, or any combination thereof. Referring to FIGS. 4 and 5, where FIG. 5 is a schematic sectional view taken along line B-B of FIG. 4, the mask 400 is then etched into a desired shape, followed by etching the stack structure 330 using the etched mask 400 as an etch mask to form a plurality of spaced-apart trenches 336 in the stack structure 330. In other words, as shown in FIGS. 4 and 5, the remaining stack structure 330 after the etching process is formed into a plurality of columns 338 that are separated from each other by the trenches 336, and subsequently, the mask 400 shown in FIGS. 4 and 5 is removed. In some embodiments, the stack structure 330 may be etched by using reactive ion etch (RIE), neutral beam etch (NBE), other suitable techniques, or any combination thereof.

Figure 6:
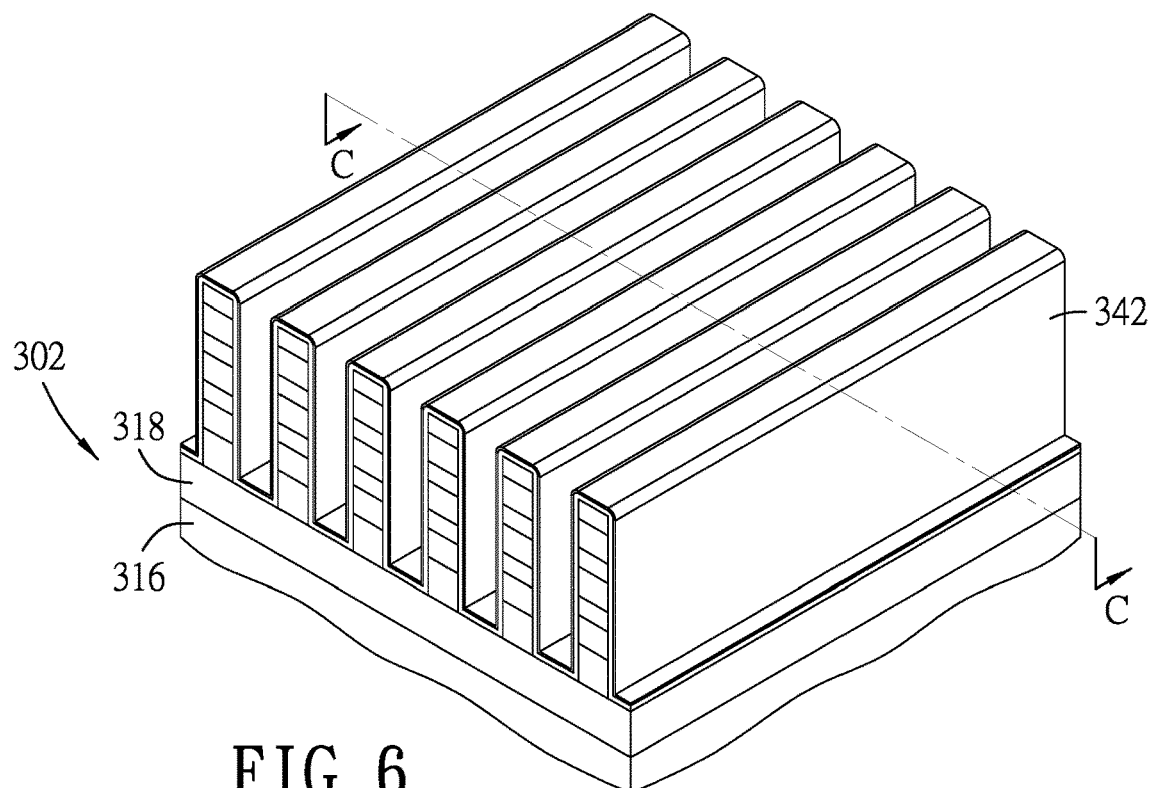
Figure 7:
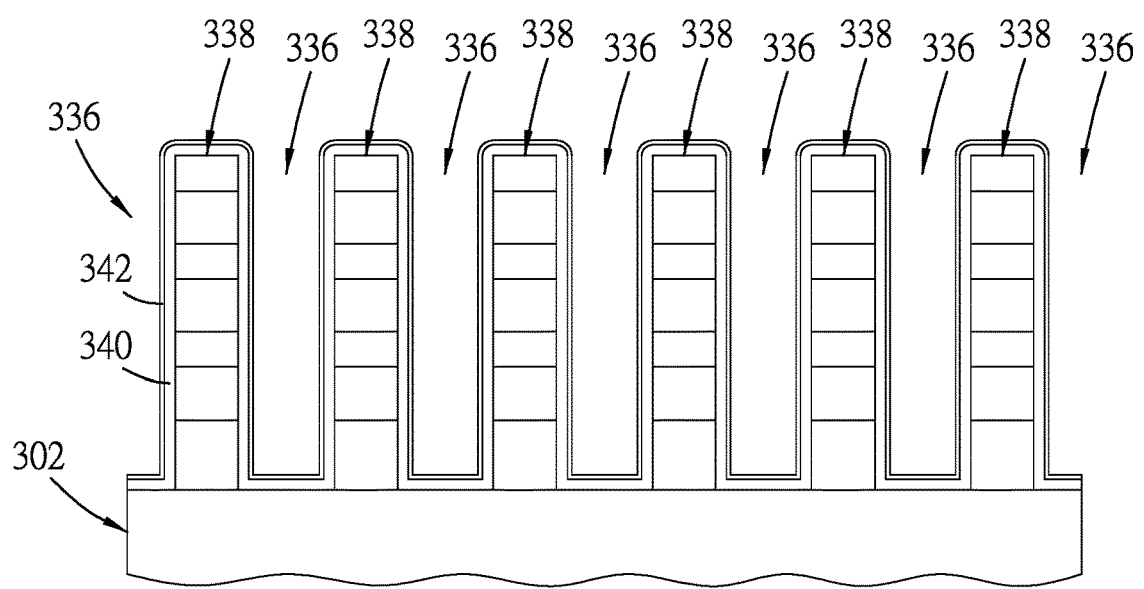

Referring to FIG. 1A, in a step 206 of the method 200, a memory layer is formed. Referring to FIGS. 6 and 7, where FIG. 7 is a schematic sectional view taken along line C-C of FIG. 6, the memory layer 340 may be conformally formed on the columns 338, in the trenches 336 and on the semiconductor structure 302. In some embodiments, the memory layer 340 may be made of a ferroelectric material, such as $HfO_2$, $HfSiO_x$, $HfZrO_x$ (HZO), $PbZrTiO_x$ (PZT), $BaSrTiO_x$ (BST), $Al_2O_3$, $TiO_2$, $LaO_x$, other suitable materials, or any combination thereof. In some embodiments, the memory layer 340 may be formed by ALD, CVD, PVD, other suitable techniques, or any combination thereof.

Referring to FIG. 1A, in a step 208 of the method 200, a channel layer is formed. Referring to FIGS. 6 and 7, the channel layer 342 may be conformally formed on the memory layer 340. In some embodiments, the channel layer 342 may be made of NiO, $Cu_2O$, $CuAlO_2$, $CuGaO_2$, $CuInO_2$, $SrCu_2O_2$, SnO, indium gallium zinc oxide (IGZO), ZnO, $In_2O_3$, $SnO_2$, doped silicon, other suitable materials, or any combination thereof. In some embodiments, the channel layer 342 may be made of IGZO, ZnO, $In_2O_3$, $SnO_2$, n-type silicon, other suitable materials, or any combination thereof for n-type semiconductor devices. In some embodiments, the channel layer 342 may be made of NiO, $Cu_2O$, $CuAlO_2$, $CuGaO_2$, $CuInO_2$, $SrCu_2O_2$, SnO, p-type silicon, other suitable materials, or any combination thereof for p-type semiconductor devices. In some embodiments, the channel layer 342 may be made by ALD, CVD, PVD, other suitable techniques, or any combination thereof.

Figure 8:
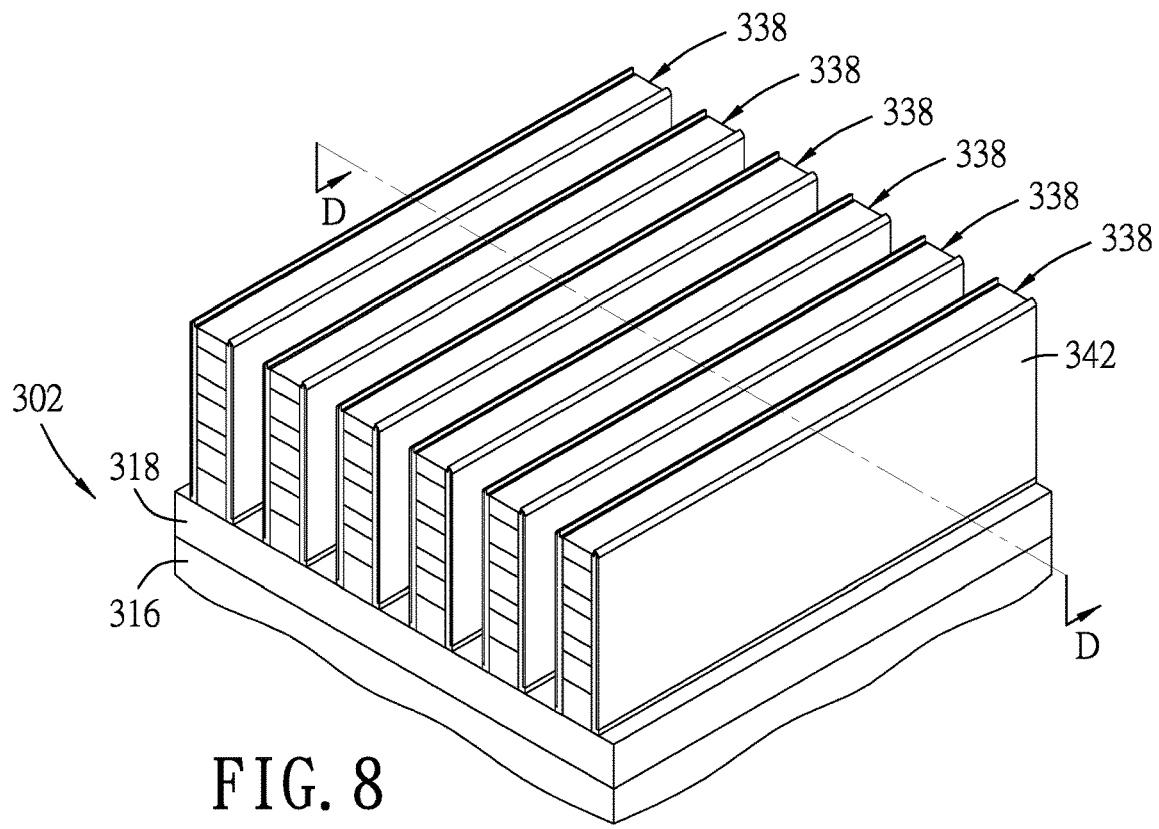
Figure 9:
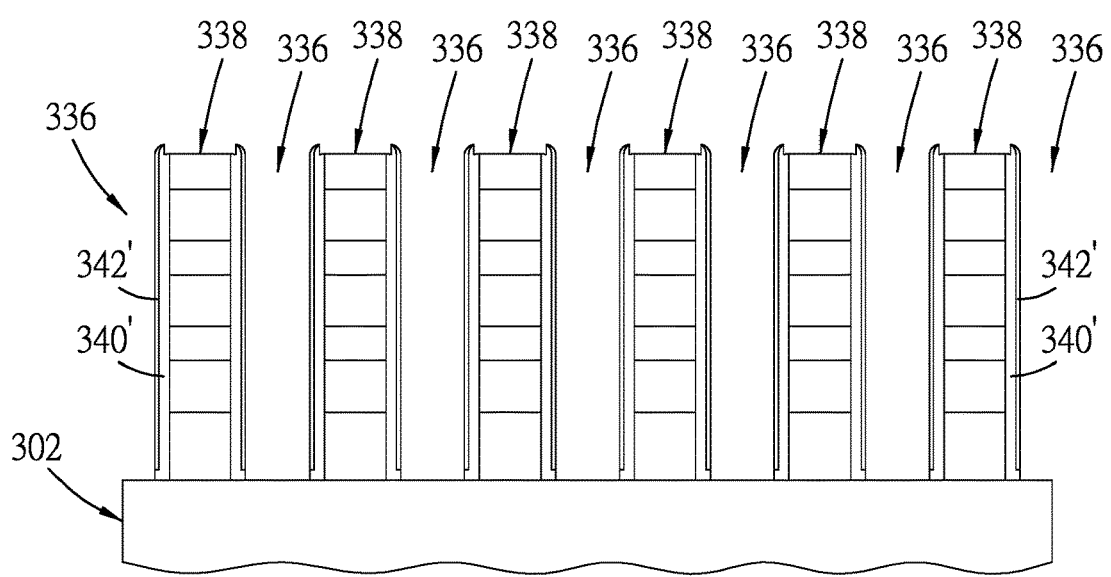

Referring to FIG. 1A, in a step 210 of the method 200, the memory and channel layers are etched. Referring to FIGS. 8 and 9, where FIG. 9 is a schematic sectional view taken along line D-D of FIG. 8, the memory and channel layers 340, 342 on top surfaces of the columns 338 and on the semiconductor structure 302 are removed, thereby forming a plurality of memory segments 340' and a plurality of channel segments 342' on side walls of the columns 338. During the step of etching the memory and channel layers 340, 342, the memory segments 340' and the channel segments 342' may be substantially unetched or only slightly etched. In some embodiments, the etching process may be an anisotropic etch using RIE or NBE, other suitable techniques, or any combination thereof.

Figure 10:
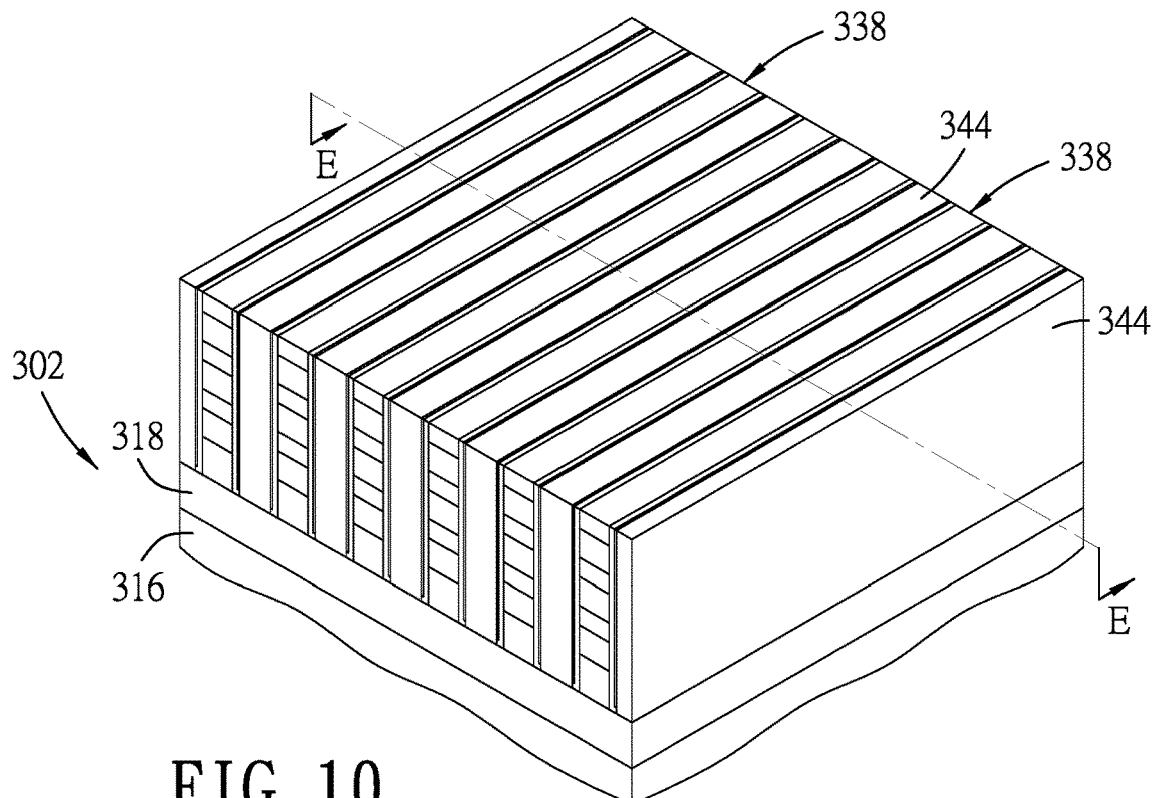
Figure 11:
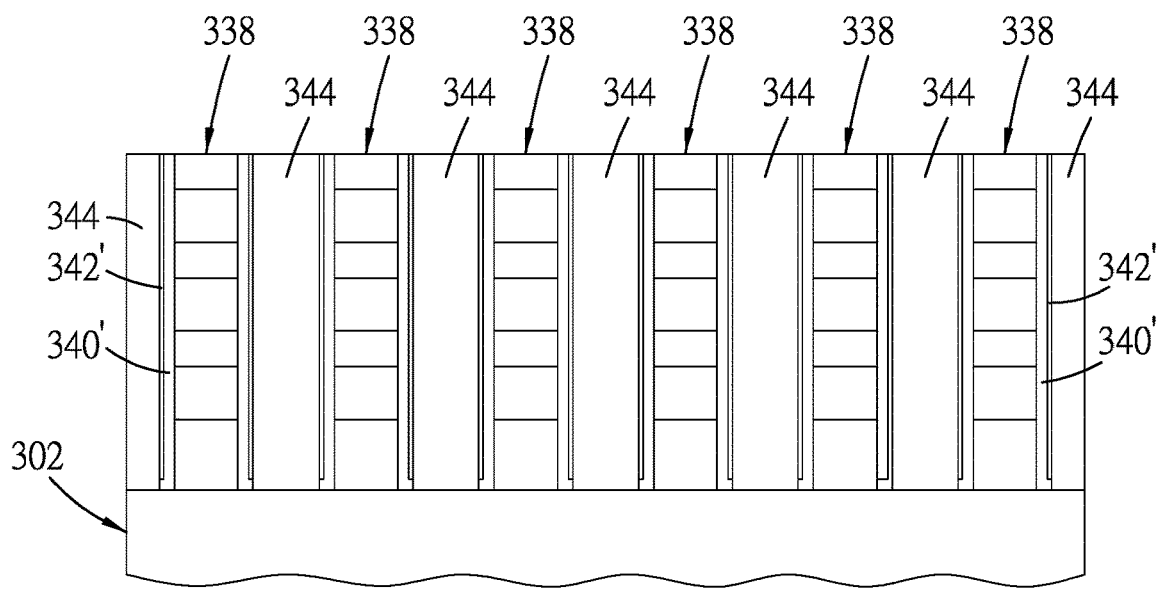

Referring to FIG. 1A, in a step 212 of the method 200, a plurality of isolation layers are formed. Referring to FIGS. 10 and 11, where FIG. 11 is a schematic sectional view taken along line E-E of FIG. 10, the isolation layers 344 are respectively formed in the trenches 336 (see FIG. 9). In some embodiments, the isolation layers 344 may be made of silicon oxide, silicon nitride, silicon oxynitride, other suitable materials, or any combination thereof. In some embodiments, the isolation layers 344 may be made by CVD, PVD, ALD, other suitable techniques, or any combination thereof. Specifically, in some embodiments, a dielectric material is filled in the trenches 336 and formed over the columns 338, which is followed by removing the dielectric material over the columns 338 to form the isolation layers 344. The removing process may be carried out by dry etching, chemical mechanical planarization (CMP), other suitable techniques, or any combination thereof. In some embodiments, top portions of the columns 338 and the memory and channel segments 340', 342' may be slightly removed during the removing process.

Figure 12:
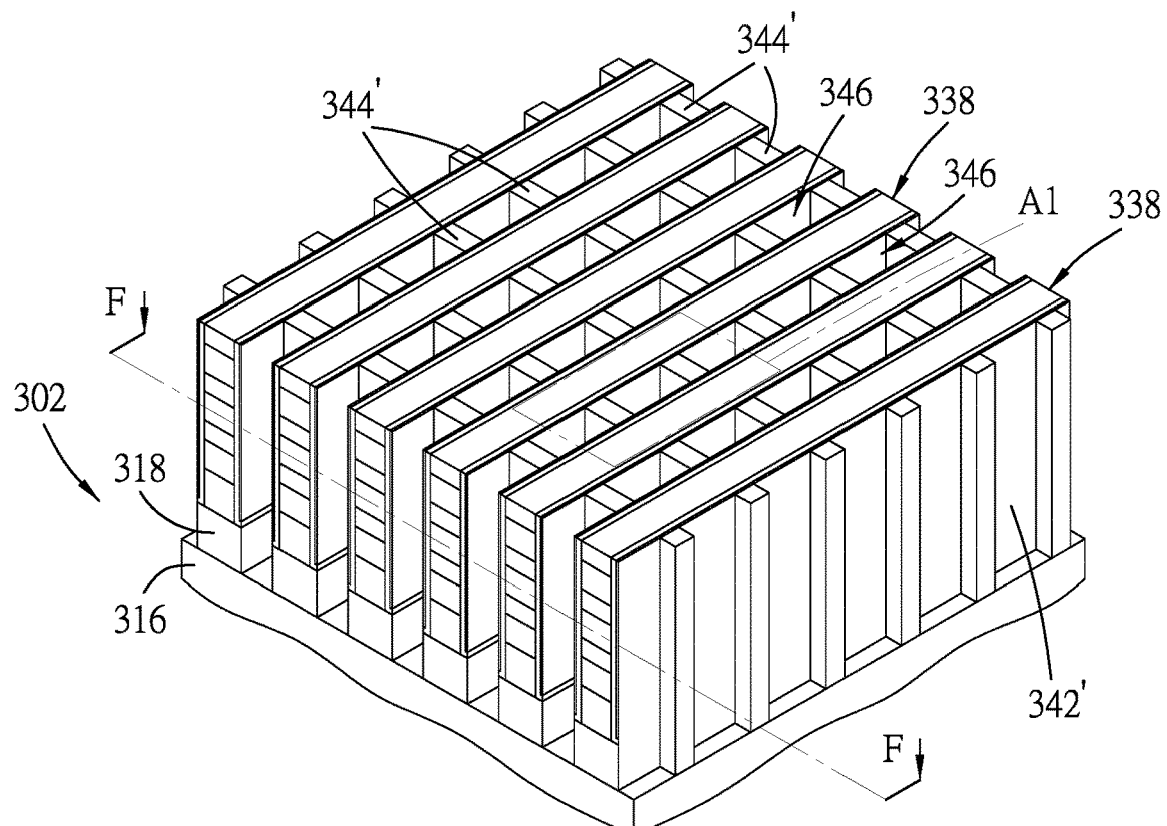
Figure 13:
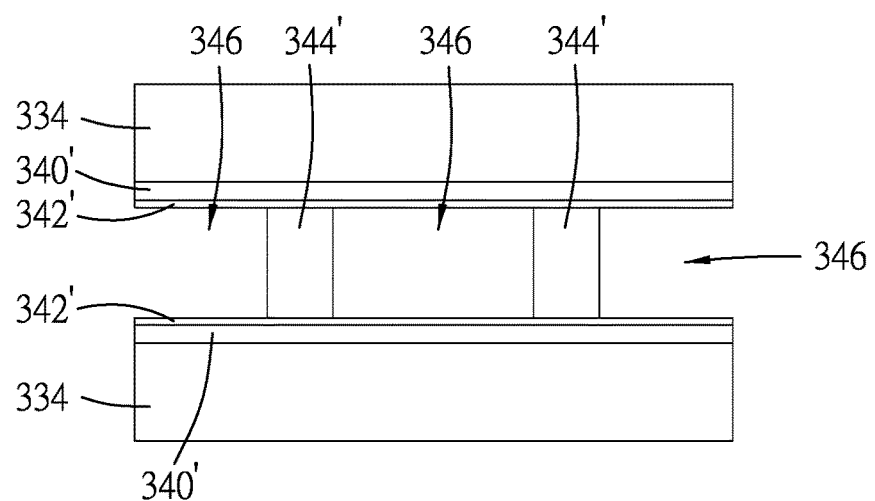

Referring to FIG. 1A, in a step 214 of the method 200, a plurality of isolation trenches are formed. Referring to FIGS. 12 and 13, where FIG. 13 is a schematic top view taken from block (A1) of FIG. 12 when the structure shown in FIG. 12 is cut along line F-F, the isolation trenches 346 are formed in the isolation layers 344 (see FIGS. 10 and 11), such that each of the isolation layers 344 is formed into a plurality of isolation structures 344' that are spaced apart from each other by the isolation trenches 346, while leaving the channel layers 342 substantially unetched. In some embodiments, the isolation trenches 346 may be formed by an anisotropic etch process using RIE, NBE, other suitable techniques, or any combination thereof. In some embodiments, the isolation trenches 346 may penetrate the fourth ILD layer 318, such that the resulting ferroelectric memory device 300 (see FIG. 26) can be electrically connected to the semiconductor structure 302 (see FIG. 3).

Figure 14:
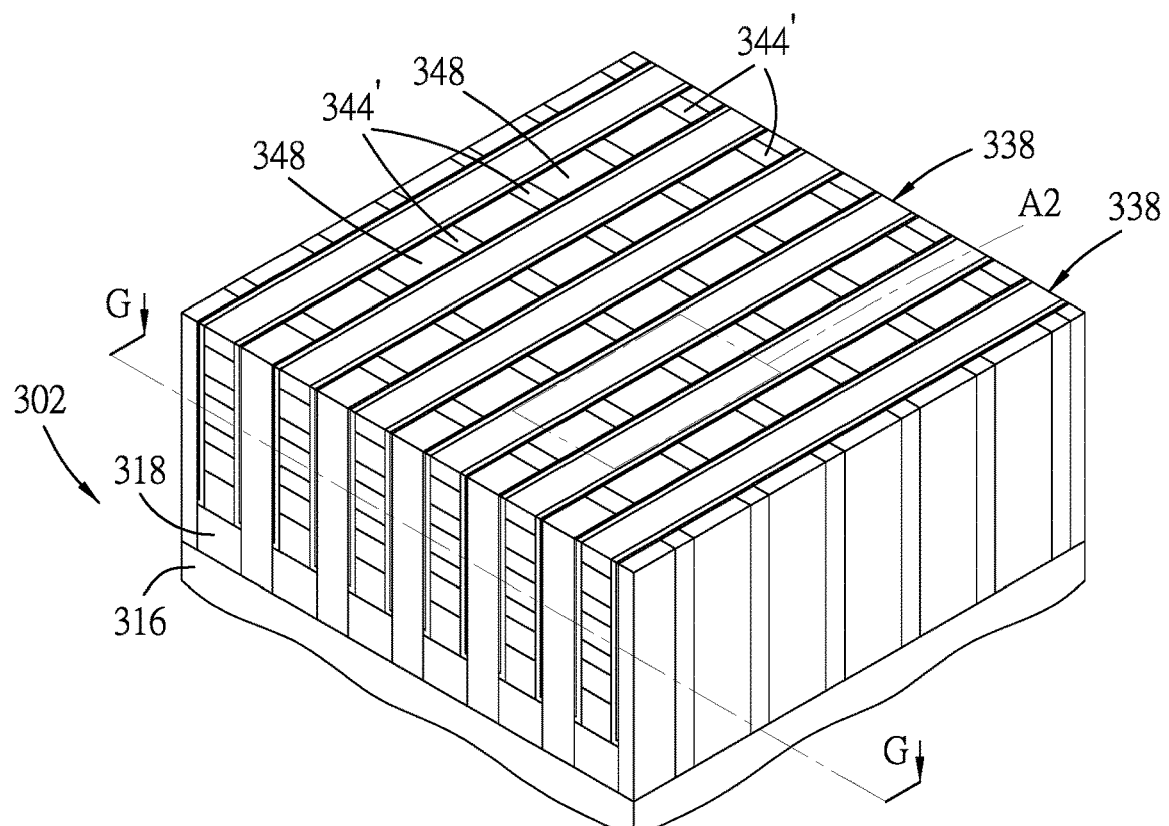
Figure 15:
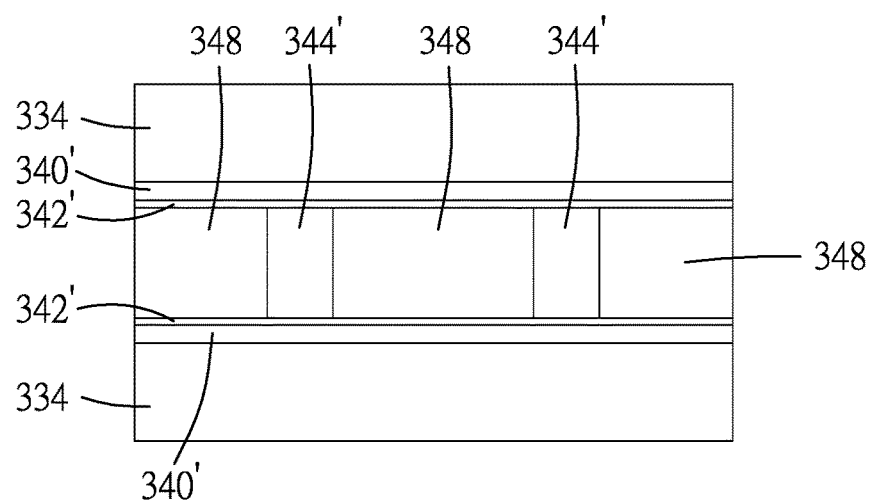

Referring to FIG. 1B, in a step 216 of the method 200, a plurality of carrier layers are formed. Referring to FIGS. 14 and 15, where FIG. 15 is a schematic top view taken from block (A2) of FIG. 14 when the structure shown in FIG. 14 is cut along line G-G, the carrier layers 348 are formed to respectively fill the isolation trenches 346 (see FIG. 12). The purpose of the carrier layers 348 will be described hereinafter. For the ferroelectric memory device 300 (see FIG. 26) with n-type channel segments 342', the carrier layers 348 may be made of a p-type material, in some embodiments, this may include NiO, $Cu_2O$, $CuAlO_2$, $CuGaO_2$, $CuInO_2$, $SrCu_2O_2$, SnO, p-type silicon, other suitable materials, or any combination thereof. For the ferroelectric memory device 300 (see FIG. 26) with p-type channel segments 342', the carrier layers 348 may be made of an n-type material, in some embodiment, this may include IGZO, ZnO, $In_2O_3$, $SnO_2$, n-type silicon, other suitable materials, or any combination thereof. In some embodiments, the carrier layers 348 may be made by CVD, PVD, ALD, other suitable techniques, or any combination thereof. Specifically, in some embodiments, the material of the carrier layers 348 is filled in the isolation trenches 346, and formed over the columns 338, which is followed by removing the material over the columns 338, and the carrier layers 348 are thus formed. The removing process may be carried out by dry etching, chemical mechanical planarization (CMP), other suitable techniques, or any combination thereof. In some embodiments, top portions of the columns 338 and the memory and channel segments 340', 342' may be slightly removed during the removing process.

Figure 16:
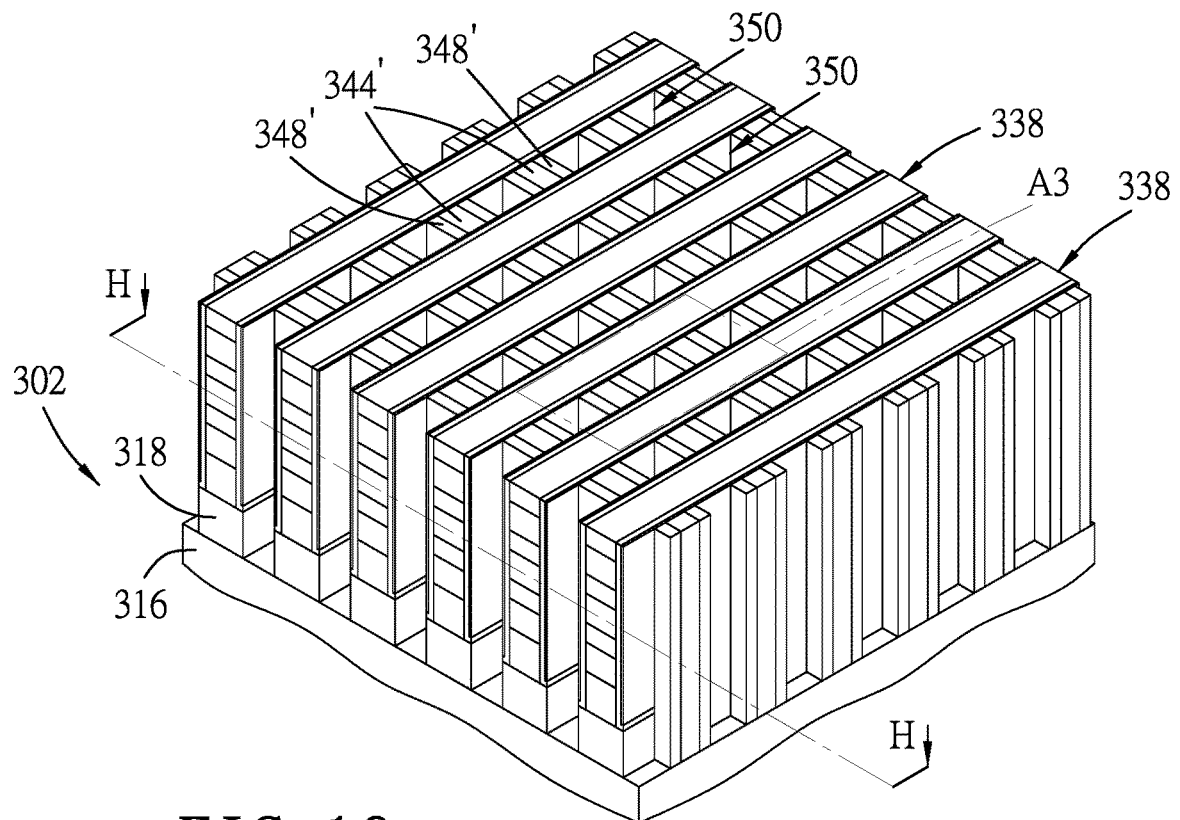
Figure 17:
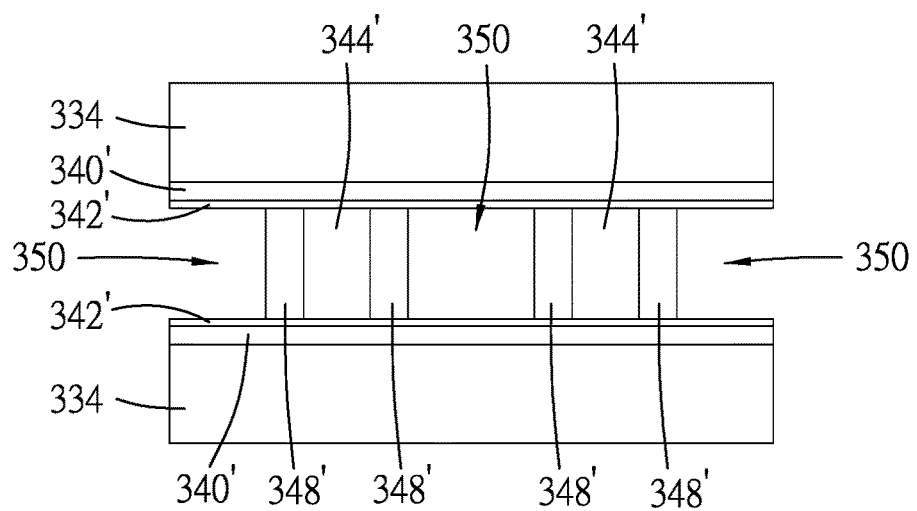

Referring to FIG. 1B, in a step 218 of the method 200, the carrier layers are etched. Referring to FIGS. 16 and 17, where FIG. 17 is a schematic top view taken from block (A3) of FIG. 16 when the structure shown in FIG. 16 is cut along line H-H, each of the carrier layers 348 (see FIGS. 14 and 15) is etched to be formed into two carrier structures 348' that are separated by a corresponding one of the dummy trenches 350, while leaving the channel segments 342' substantially unetched. As shown in FIG. 17, the carrier structures 348' formed from each of the carrier layers 348 are respectively connected to corresponding two of the isolation structures 344'. In some embodiments, the etching process may be an anisotropic etch process using RIE, NBE, other suitable techniques, or any combination thereof.

Figure 18:
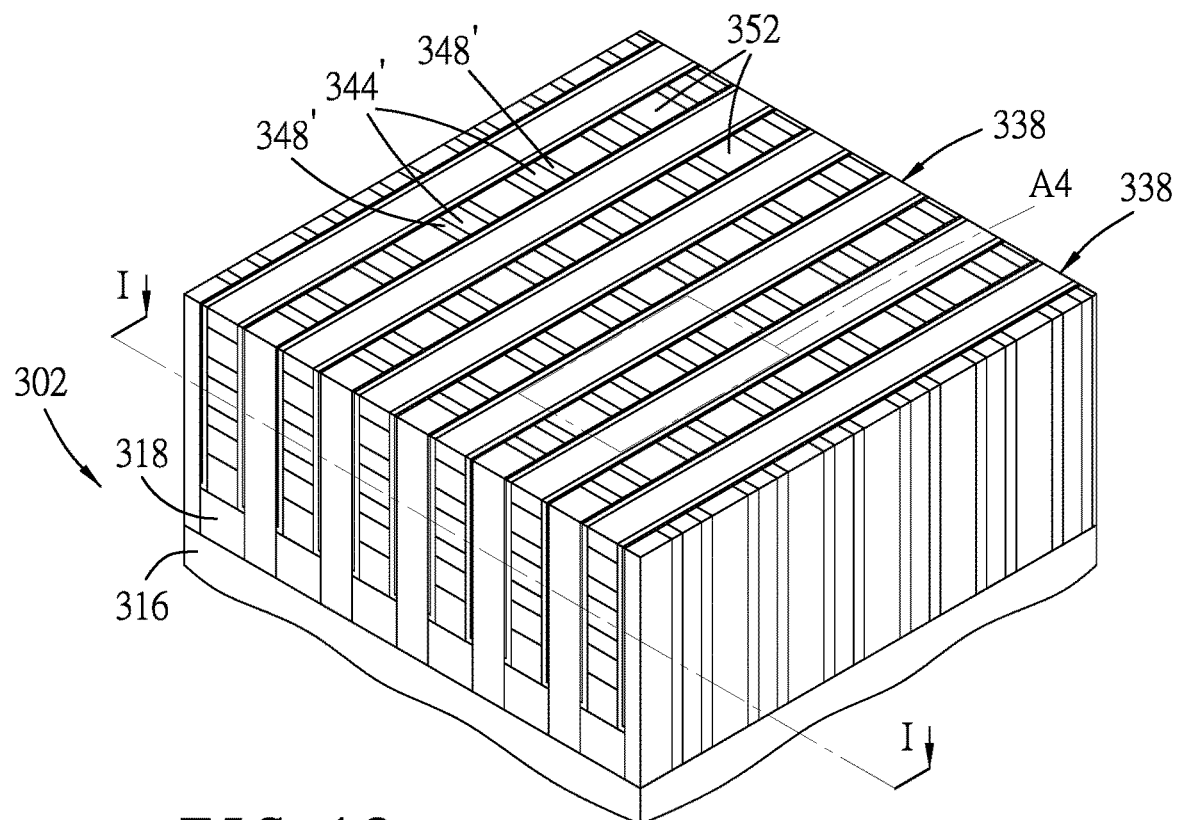
Figure 19:
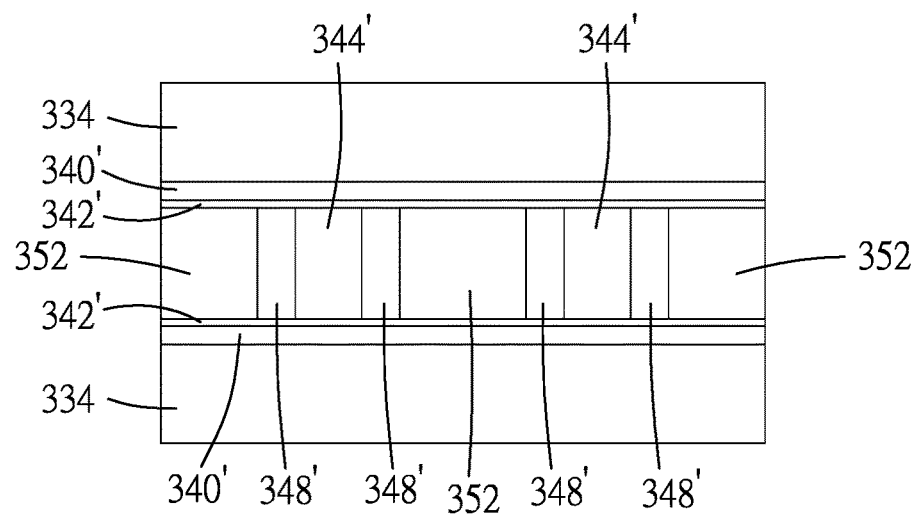

Referring to FIG. 1B, in a step 220 of the method 200, a plurality of dummy layers are formed. Referring to FIGS. 18 and 19, where FIG. 19 is a schematic top view taken from block (A4) of FIG. 18 when the structure shown in FIG. 18 is cut along line I-I, the dummy layers 352 are respectively formed in the dummy trenches 350 (see FIGS. 16 and 17). In some embodiments, the dummy layers 352 may be made of silicon oxide, silicon nitride, silicon oxynitride, other suitable materials, or any combination thereof. In some embodiments, the dummy layers 352 may be made by CVD, PVD, ALD, other suitable techniques, or any combination thereof. Specifically, in some embodiments, a material for forming the dummy layers 352 is used to fill in the dummy trenches 350 and used for forming over the columns 338, which is followed by removing the material over the columns 338, and the dummy layers 352 are thus formed. The removing process may be carried out by dry etching, CMP, other suitable techniques, or any combination thereof. In some embodiments, top portions of the columns 338 and the memory and channel segments 340', 342' may be slightly removed during the removing process.

Figure 20:
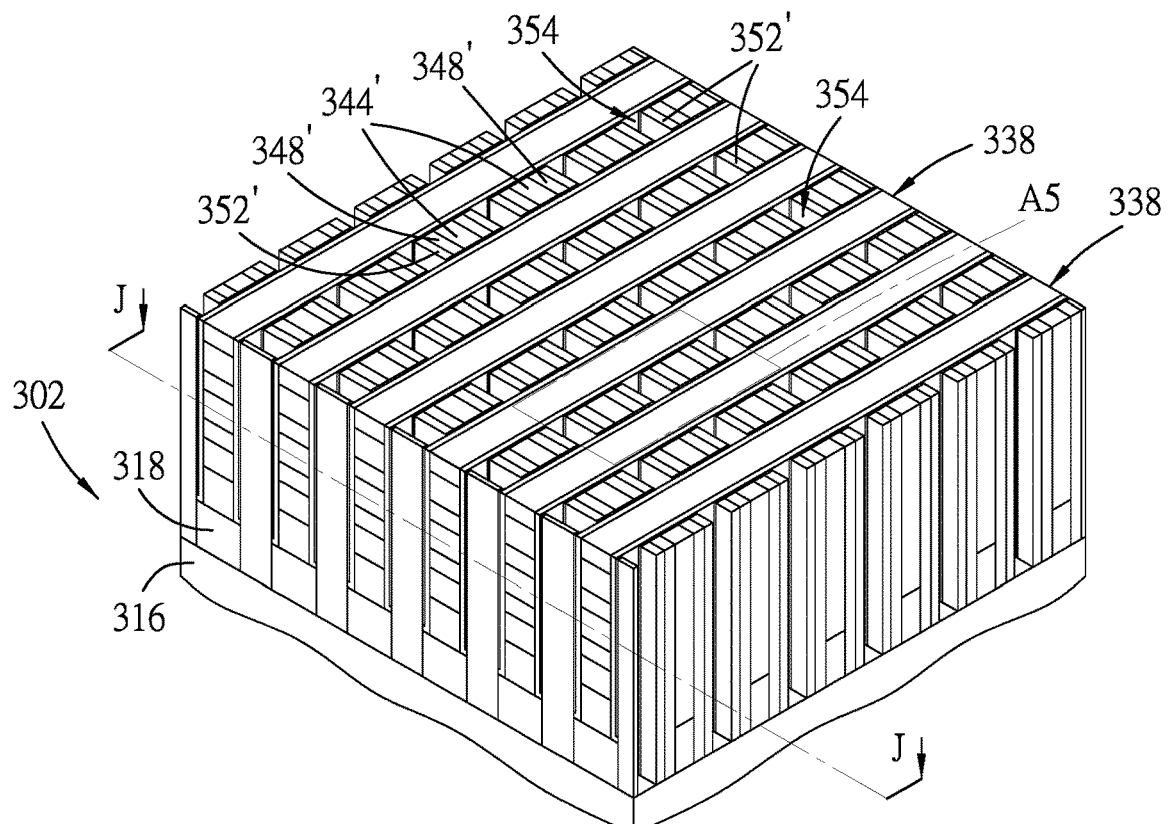
Figure 21:
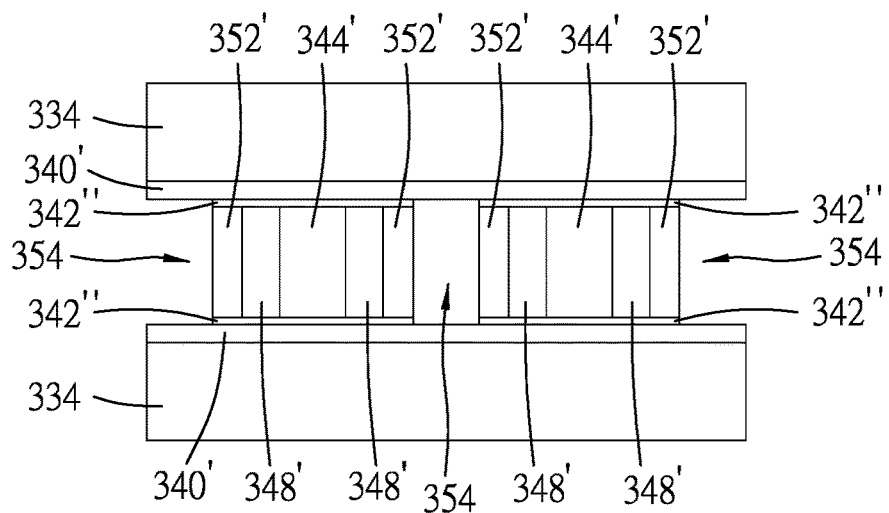

Referring to FIG. 1B, in a step 222 of the method 200, the dummy layers are etched. Referring to FIGS. 20 and 21, where FIG. 21 is a schematic top view taken from block (A5) of FIG. 20 when the structure shown in FIG. 20 is cut along line J-J, each of the dummy layers 352 (see FIGS. 18 and 19) is etched to be formed into two dummy structures 352' that are separated by a corresponding one of separation trenches 354. As shown in FIG. 21, the dummy structures 352' formed from each of the dummy layers 352 are respectively connected to corresponding two of the carrier structures 348'. In some embodiments, each of the channel segments 342' (see FIG. 19) is also etched into a plurality of channel portions 342". In some embodiments, the etching process may be an anisotropic etch process using RIE, NBE, other suitable techniques, or any combination thereof.

Figure 22:
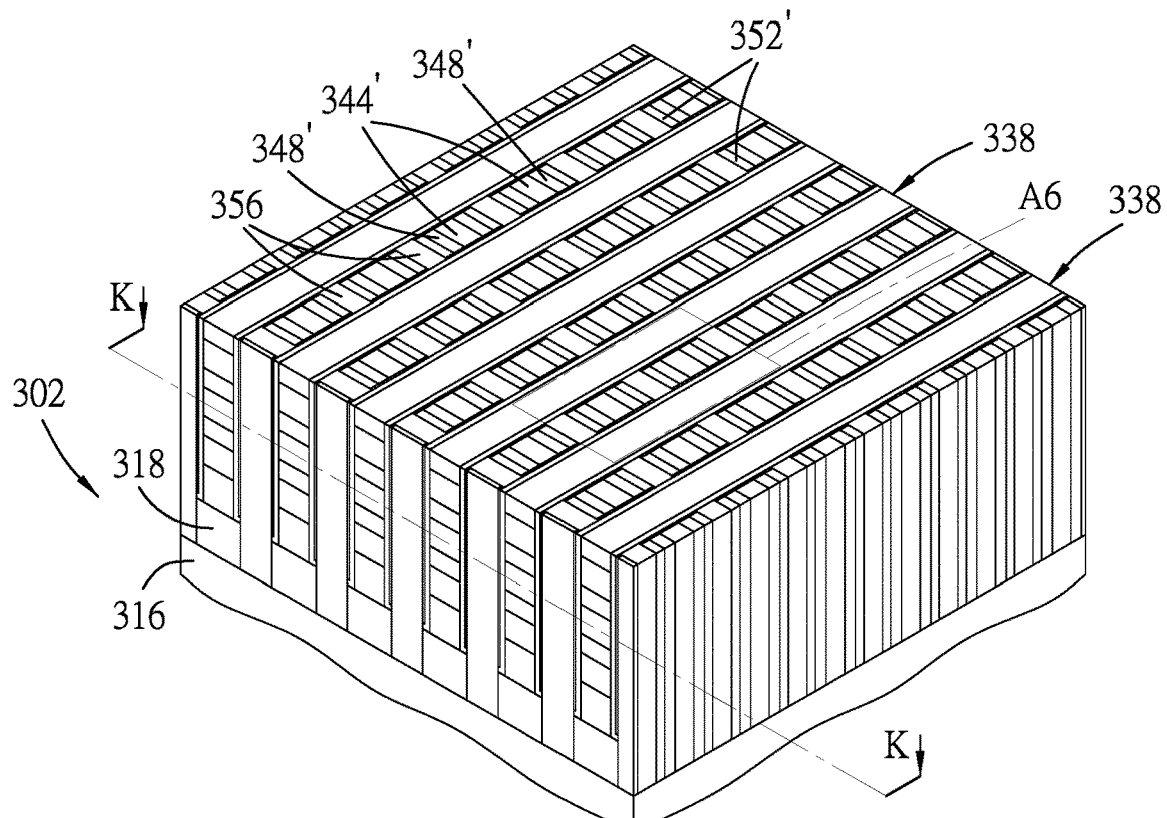
Figure 23:
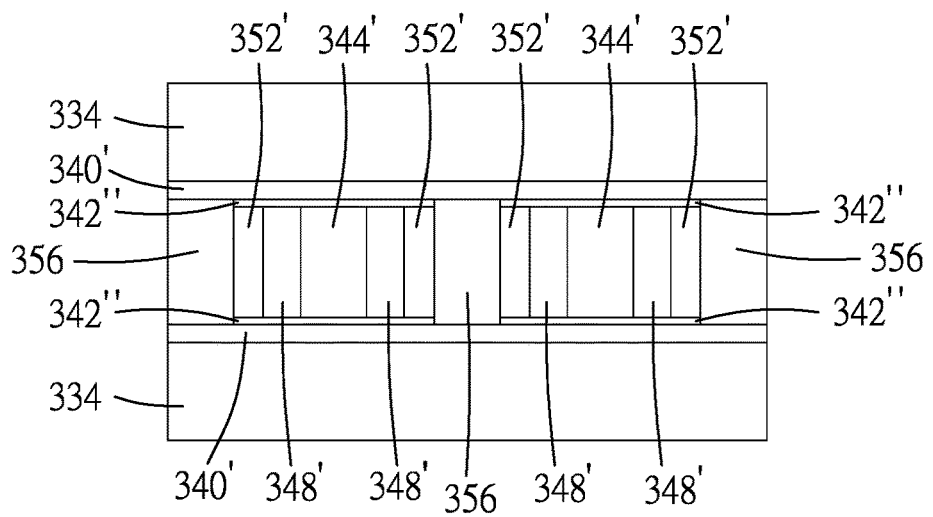

Referring to FIG. 1B, in a step 224 of the method 200, a plurality of separation layers are formed. Referring to FIGS. 22 and 23, where FIG. 23 is a schematic top view taken from block (A6) of FIG. 22 when the structure shown in FIG. 22 is cut along line K-K, the separation layers 356 are respectively formed in the separation trenches 354 (see FIGS. 20 and 21). In some embodiments, the separation layers 356 may be made of silicon oxide, silicon nitride, silicon oxynitride, other suitable materials, or any combination thereof. In some embodiments, the separation layers 356 may be made by CVD, PVD, ALD, other suitable techniques, or any combination thereof. Specifically, in some embodiments, a material for forming the separation layers 356 is used to fill in the separation trenches 354 and used for forming over the columns 338, which is by removing the material over the columns 338, and the separation layers 356 are thus formed. The removing process may be carried out by dry etching, CMP, other suitable techniques, or any combination thereof. In some embodiments, top portions of the columns 338 and the memory segments 340' and the channel portions 342" may be slightly removed during the removing process.

Figure 24:
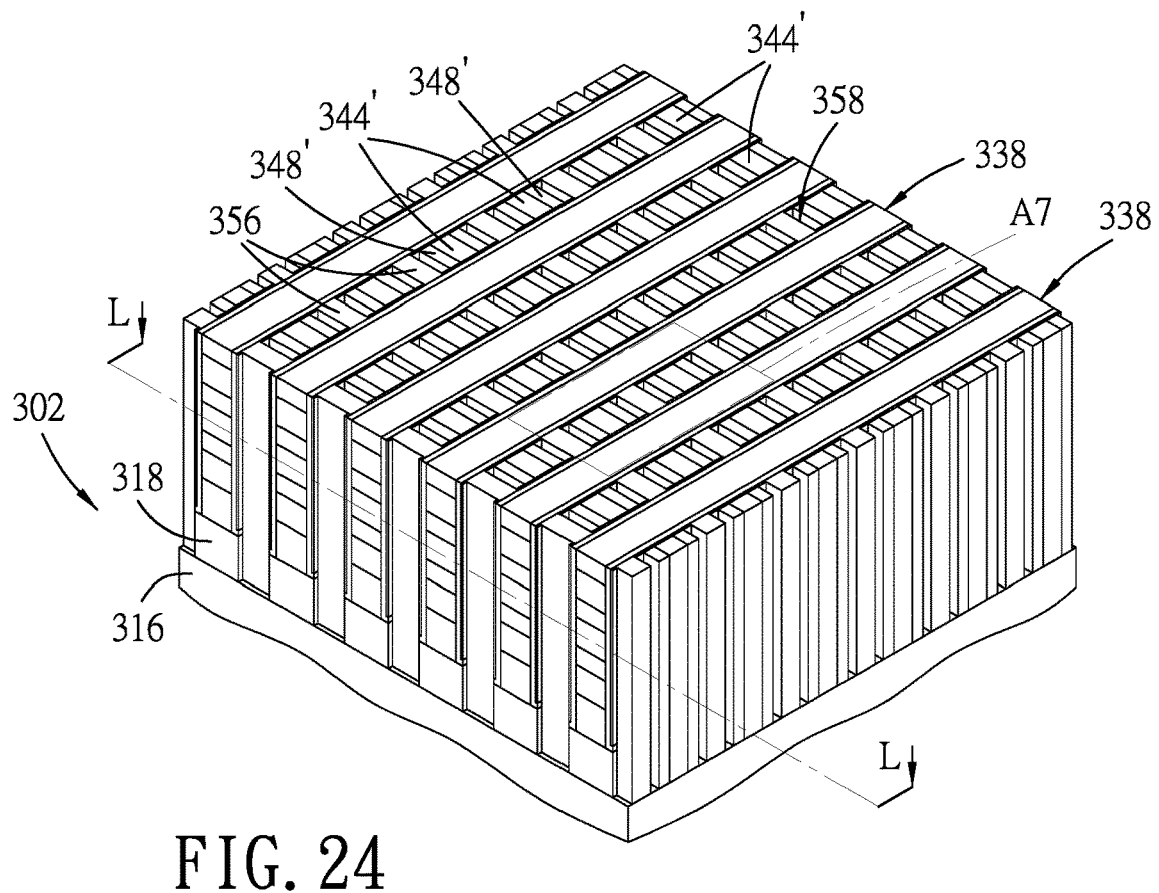
Figure 25:
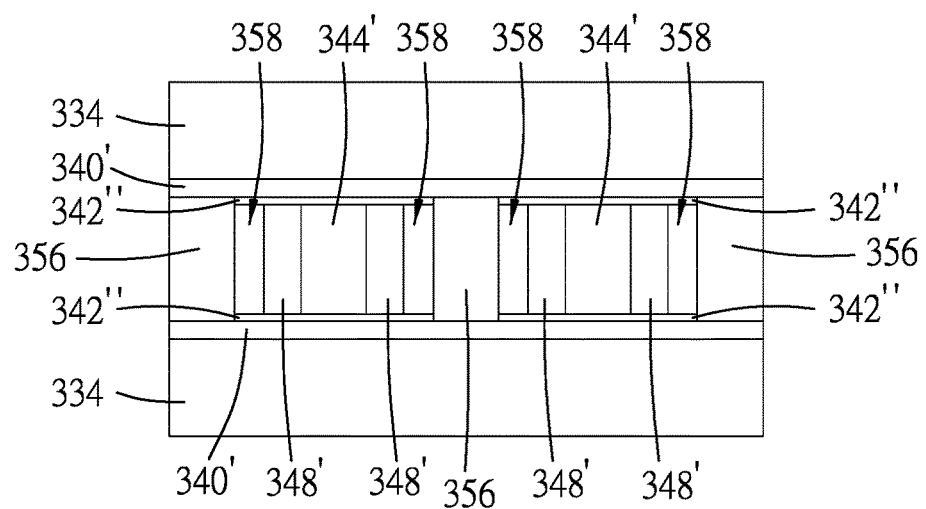

Referring to FIG. 1B, in a step 226 of the method 200, the dummy structures are removed. Referring to FIGS. 24 and 25, where FIG. 25 is a schematic top view taken from block (A7) of FIG. 24 when the structure shown in FIG. 24 is cut along line L-L, the dummy structures 352' (see FIGS. 22 and 23) are removed by using wet chemical etching, dry etching, other suitable techniques, or any combination thereof, thereby forming a plurality of source/bit line trenches 358. In some embodiments, the dummy structures 352' and the separation layers 356 may be made of materials that have different etch rates relative to a certain type of etchant. For example, the dummy structures 352' may be made of silicon nitride-based materials while the separation layers 356 may be made of silicon oxide-based materials, such that when the dummy structures 352' are being removed, the separation layers 356 are substantially unetched or only slightly etched.

Figure 26:
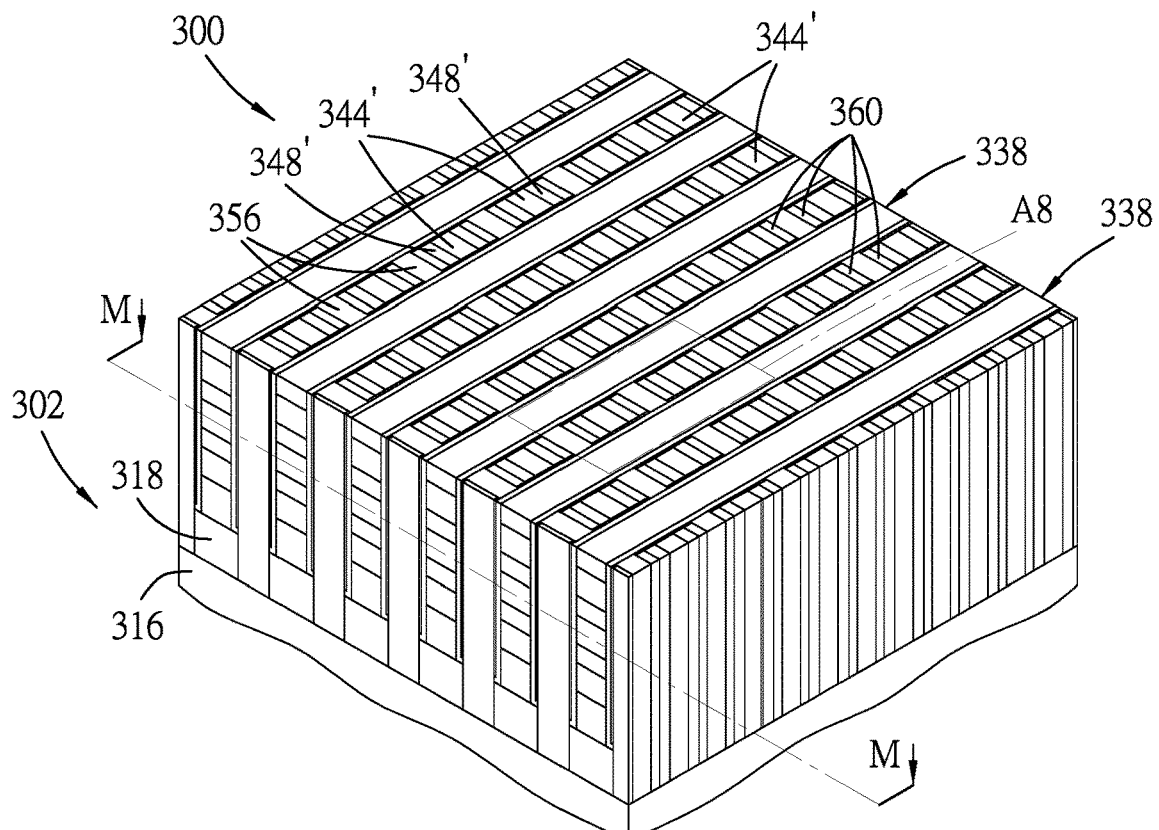
Figure 27:
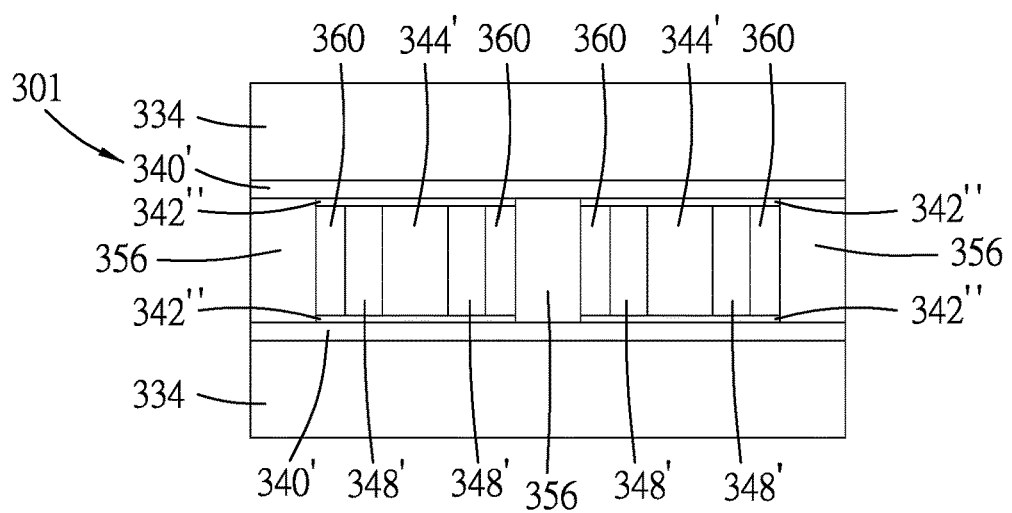

Referring to FIG. 1B, in a step 228 of the method 200, a plurality of source/bit lines are formed. Referring to FIGS. 26 and 27, where FIG. 27 is a schematic top view taken from block (A8) of FIG. 26 when the structure shown in FIG. 26 is cut along line M-M, the source/bit lines 360 are respectively formed in the source/bit line trenches 358 (see FIGS. 24 and 25), thereby obtaining the ferroelectric memory device 300. In some embodiments, the source/bit lines 360 may be made of Al, Ru, W, Ta, TaN, Ti, TiN, Cu, other suitable materials, or any combination thereof. In some embodiments, the source/bit lines 360 may be made by CVD, PVD, ALD, other suitable techniques, or any combination thereof. Specifically, in some embodiments, a material for forming the source/bit lines 360 is used to fill in the source/bit line trenches 358, and used for forming over the columns 338, which is followed by removing the material over the columns 338, and the source/bit lines 360 are thus formed. The removing process may be carried out by dry etching, CMP, other suitable techniques, or any combination thereof. In some embodiments, top portions of the columns 338 and the memory segments 340' and the channel portions 342" may be slightly removed during the removing process.

Referring to FIGS. 26 and 27, in some embodiments, the ferroelectric device 300 includes the semiconductor structure 302, the stack structure 330 that is disposed on the semiconductor structure 302, and a plurality of memory arrays 301 that extend through the stack structure 330. Each of the memory arrays 301 includes two of the memory segments 340' that are spaced apart from each other, a plurality of the channel portions 342" that are spaced apart from each other and each being connected to a corresponding one of the memory segments 340', and multiple pairs of the source/bit lines 360 that are spaced apart from each other. Each of the pairs of the source/bit lines 360 is connected between corresponding two of the channel portions 342". In some embodiments, the ferroelectric memory device 300 further includes a plurality of the carrier structures 348', such that, for each pair of the source/bit lines 360, at least one of the carrier structures 348' is connected to a corresponding one of the source/bit lines 360 of the pair.

Figure 28:
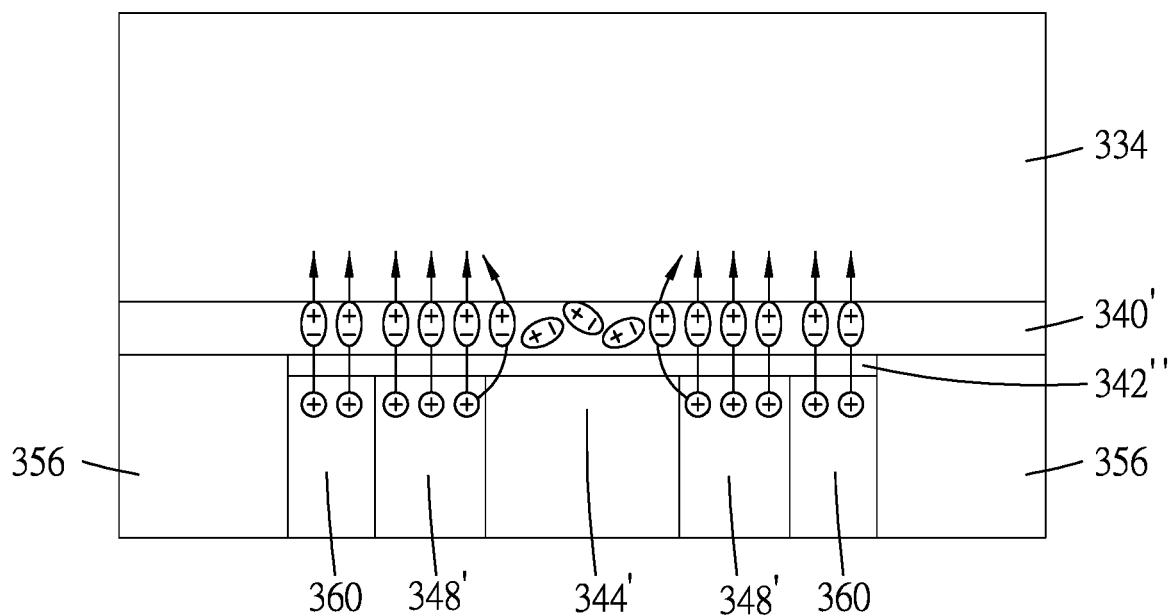
FIG. 28 is a schematic view illustrating a ferroelectric memory device being operated in an erase state, in accordance with some embodiments.

In operation, the channel portions 342" of the ferroelectric memory device 300 have fewer minority carriers as compared to their majority carriers. Therefore, when the ferroelectric memory device 300 is in an erase state, the number of the minority carriers in the channel portions 342" may not be enough to result in a large electric field to polarize the ferroelectric memory layers (e.g., the memory segments 340') of the device, which leads to a small memory window of the ferroelectric memory device 300. FIG. 28 is a schematic enlarged view taken from FIG. 27, and is exemplified to be an n-type ferroelectric memory device, where holes are the minority carrier. As illustrated in FIG. 28, the carrier structures 348' provide extra minority carriers (i.e., holes), which leads to a greater electric field for polarizing the memory segment 340'. In addition, as shown by the curved arrow in FIG. 28, the fringing field resulting from the extra minority carriers of the carrier structures 348' may further polarize the memory segment 340', which also contributes to an increase of memory window. The isolation structure 344' between the carrier structures 348' may prevent leakage current flowing from one of the carrier structures 348' to the other one of the carrier structures 348'.

Figure 29:
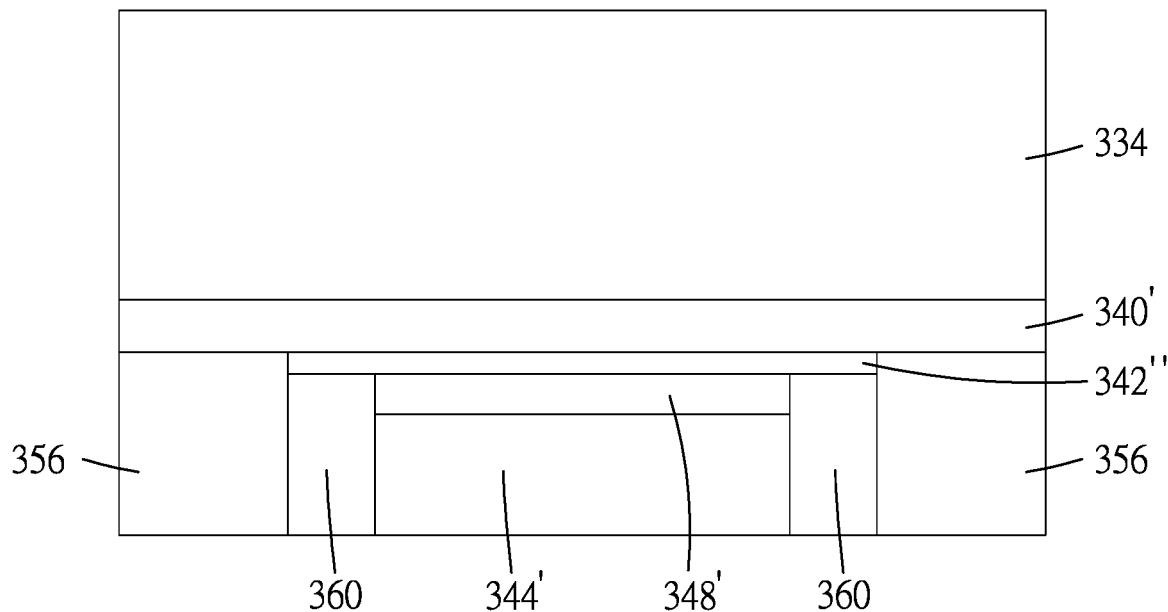
FIGS. 29 to 33 are schematic views showing different variations of a ferroelectric memory device in accordance with some embodiments.

FIG. 29 is a schematic enlarged view with a structure modified from that of FIG. 28. As shown in FIG. 29, the carrier structure 348' may extend from one of the source/bit lines 360 to the other one of the source/bit lines 360, thereby providing extra minority carriers for further polarization of the memory segment 340'.

Figure 30:
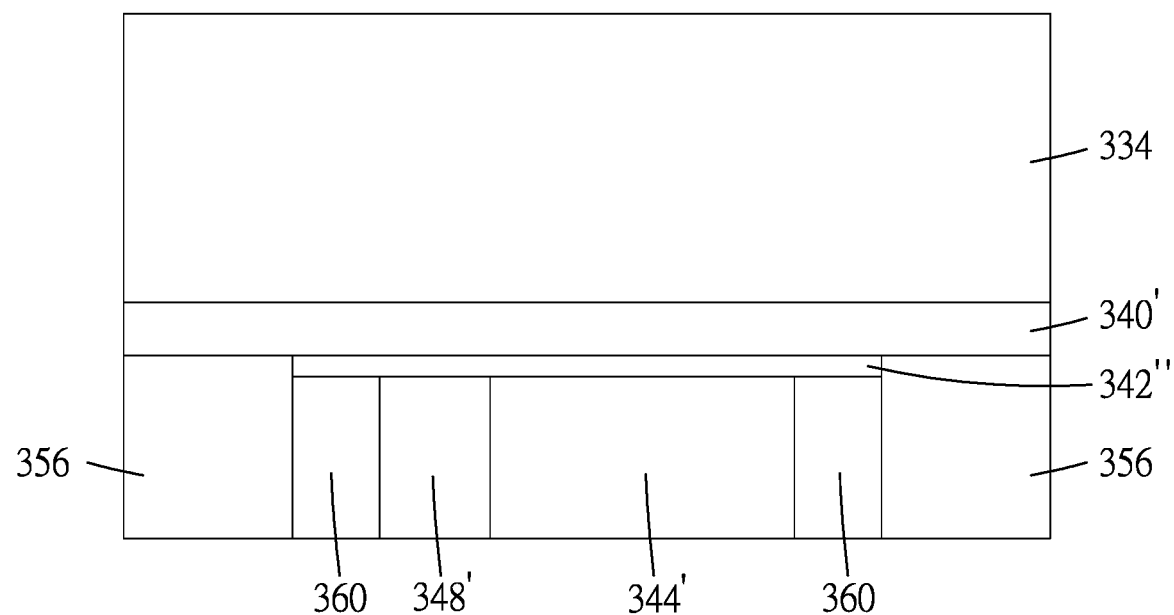
Figure 31:
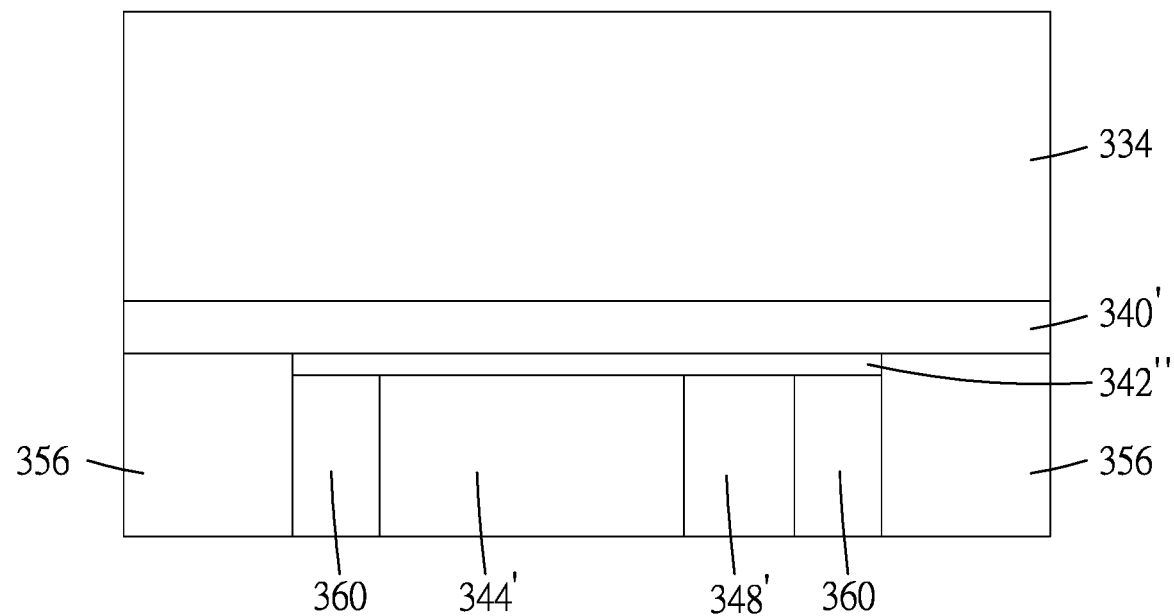

FIG. 30 is schematic enlarged view with a structure modified from that of FIG. 28. As shown in FIG. 30, there may be only one carrier structure 348' that is directly connected to one of the source/bit lines 360. FIG. 31 shows that the carrier structure 348' is directly connected to the other one of the source/bit lines 360. For example, in FIG. 30, the source/bit line 360 connected to the carrier structure 348' may be a source line, and the other source/bit line 360 may be a bit line. In FIG. 31, the source/bit line 360 connected to the carrier structure 348' may be a bit line, and the other source/bit line 360 may be a source line.

Figure 32:
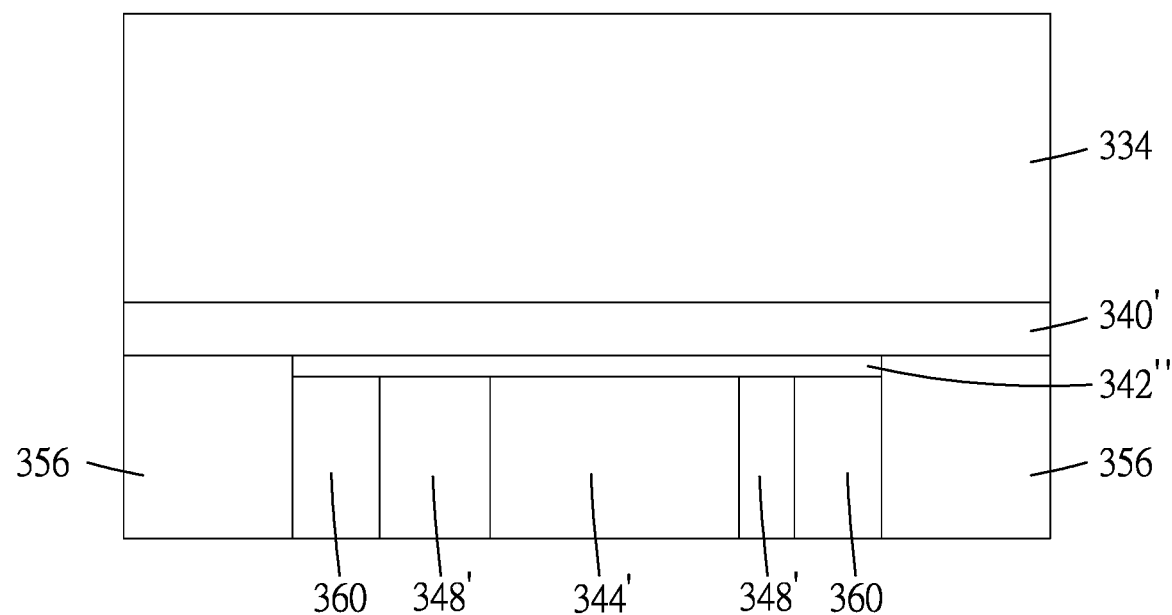
Figure 33:
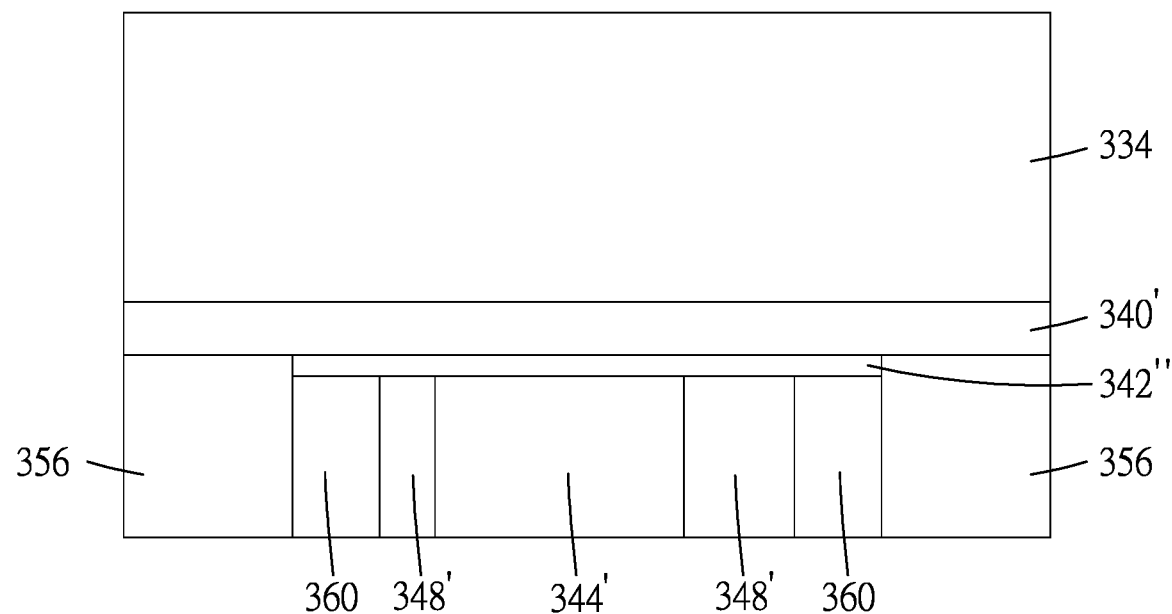

FIGS. 32 and 33 are schematic enlarged view with structures modified from that of FIG. 28, where FIGS. 32 and 33 show that the carrier structures 348' may have different values of thickness. One of the source/bit lines 360 may be a source line, and the other one of the source/bit lines 360 may be a bit line, according to practical requirements.

In this disclosure, the at least one carrier structure 348' contains extra minority carriers that can further polarizing the memory segment 340' when the ferroelectric memory device 300 is operated in the erase state, thereby contributing to the increase of memory window of the ferroelectric memory device 300. Compared to a ferroelectric memory device without the carrier structures 348' of this disclosure, the ferroelectric memory device 300 of this disclosure may have at least about 30% improvement in memory window. In addition, compared to the ferroelectric memory device without the carrier structures 348' of this disclosure, the ferroelectric memory device 300 of this disclosure may have at least 60% decrease in leakage current ($I_{off}$).

In accordance with some embodiments of the present disclosure, a ferroelectric memory device includes a semiconductor structure, a stack structure and a plurality of memory arrays. The stack structure is disposed on the semiconductor structure, and includes a plurality of dielectric layers and a plurality of conductive layers that are alternatingly stacked. The memory arrays extend through the stack structure. Each of the memory arrays includes two spaced-apart memory segments connecting to the stack structure, a plurality of spaced-apart channel portions each being connected to a corresponding one of the memory segments, and multiple pairs of source/bit lines that are spaced apart from each other. Each of the pairs of the source/bit lines is connected between corresponding two of the channel portions. The ferroelectric memory device further includes a plurality of carrier structures each of which is connected to one of the source/bit lines in a corresponding one of the pairs of the source/bit lines, and is separated from the other one of the source/bit lines in the corresponding one of the pairs of the source/bit lines.

In accordance with some embodiments of the present disclosure, each of the carrier structures, which is connected to the one of the source/bit lines in the corresponding one of the pairs of the source/bit lines, is separated from the other one of the source/bit lines in the corresponding one of the pairs of the source/bit lines by an isolation structure made of a dielectric material.

In accordance with some embodiments of the present disclosure, in the corresponding one of the pairs of the source/bit lines, the one of the source/bit lines connected to the corresponding one of the carrier structures is a source line.

In accordance with some embodiments of the present disclosure, in the corresponding one of the pairs of the source/bit lines, the one of the source/bit lines connected to the corresponding one of the carrier structures is a bit line.

In accordance with some embodiments of the present disclosure, the ferroelectric memory device is an n-type semiconductor device, and the carrier structures are made of NiO, $Cu_2O$, $CuAlO_2$, $CuGaO_2$, $CuInO_2$, $SrCu_2O_2$, SnO, or p-type silicon.

In accordance with some embodiments of the present disclosure, the ferroelectric memory device is a p-type semiconductor device, and the carrier structures are made of IGZO, ZnO, $In_2O_3$, $SnO_2$, or n-type silicon.

In accordance with some embodiments of the present disclosure, for each pair of the source/bit lines, each of the source/bit lines is connected to a corresponding one of the carrier structures.

In accordance with some embodiments of the present disclosure, for each pair of the source/bit lines, the carrier structures, which respectively connected to the source/bit lines, have different values of thickness.

In accordance with some embodiments of the present disclosure, a ferroelectric memory device includes a stack structure, two spaced-apart memory segments, two spaced-apart channel portions, two spaced-apart source/bit lines and at least one carrier structure. The stack structure includes two columns each including a plurality of dielectric layers and a plurality of conductive layers that are alternatingly stacked. The memory segments are respectively connected to side walls of the columns. The channel portions are respectively connected to the memory segments. The source/bit lines are connected between the channel portions. The at least one carrier structure is connected to one of the source/bit lines.

In accordance with some embodiments of the present disclosure, the at least one carrier structure is separated from the other one of the source/bit lines by an isolation structure made of a dielectric material.

In accordance with some embodiments of the present disclosure, the one of the source/bit lines connected to the at least one carrier structure is a source line.

In accordance with some embodiments of the present disclosure, the one of the source/bit lines connected to the at least one carrier structure is a bit line.

In accordance with some embodiments of the present disclosure, the at least one carrier structure is made of NiO, $Cu_2O$, $CuAlO_2$, $CuGaO_2$, $CuInO_2$, $SrCu_2O_2$, SnO, IGZO, ZnO, $In_2O_3$, $SnO_2$, or doped silicon.

In accordance with some embodiments of the present disclosure, the memory segments are made of a ferroelectric material.

In accordance with some embodiments of the present disclosure, the ferroelectric memory device includes two of the carrier structures that are respectively connected to the source/bit lines.

In accordance with some embodiments of the present disclosure, the carrier structures have different values of thickness.

In accordance with some embodiments of the present disclosure, a method for manufacturing a ferroelectric memory device includes: forming a stack structure on a semiconductor structure; etching the stack structure into a plurality of columns that are separated by a plurality of trenches; forming a memory layer on the columns and in the trenches; forming a channel layer on the memory layer; etching the memory layer and the channel layer to form a plurality of memory segments and a plurality of channel segments on side walls of the columns; forming a plurality of isolation layers in the trenches; etching each of the isolation layers to form two isolation structures and an isolation trench separating the isolation structures; forming a plurality of carrier layers in the isolation trenches; etching each of the carrier layers to form at least one carrier structure and a dummy trench adjacent to the at least one carrier structure; forming a plurality of dummy layers in the dummy trenches; etching each of the dummy layers to form two dummy structures and a separation trench separating the dummy structures; forming a plurality of separation layers in the separation trenches; removing the dummy structures to form a plurality of source/bit line trenches; and forming a plurality of source/bit lines in the source/bit line trenches.

In accordance with some embodiments of the present disclosure, in the step of etching each of the carrier layers, each of the carrier layers is etched to form two carrier structures that are separated by a corresponding one of the dummy trenches.

In accordance with some embodiments of the present disclosure, in the step of removing the dummy structures, each of the source/bit line trenches is formed to be immediately adjacent to a corresponding one of the carrier structures. In the step of forming the source/bit lines, each of the source/bit lines is connected to a corresponding one of the carrier structures.

In accordance with some embodiments of the present disclosure, in the step of etching the carrier layers, the carrier structures formed from each of the carrier layers have different values of thickness.

The foregoing outlines features of several embodiments so that those skilled in the art may better understand the aspects of the present disclosure. Those skilled in the art should appreciate that they may readily use the present disclosure as a basis for designing or modifying other processes or structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A ferroelectric memory device comprising:
a semiconductor structure;
a stack structure disposed on the semiconductor structure, the stack structure including a plurality of dielectric layers and a plurality of conductive layers that are alternatingly stacked; and
a plurality of memory arrays that extend through the stack structure,
each of the plurality of memory arrays including two spaced-apart memory segments connecting to the stack structure, a plurality of spaced-apart channel portions each being connected to a corresponding one of the two spaced-apart memory segments, and multiple pairs of source/bit lines that are spaced apart from each other, each of the multiple pairs of source/bit lines being sandwiched between and in contact with corresponding two of the plurality of spaced-apart channel portions, and
the ferroelectric memory device further including a plurality of carrier structures each of which is connected to at least one of source/bit lines in a corresponding one of the multiple pairs of source/bit lines.

2. The ferroelectric memory device as claimed in claim 1, wherein the each of the plurality of carrier structures is connected to one of the source/bit lines in the corresponding one of the multiple pairs of source/bit lines, and is separated from the other one of the source/bit lines in the corresponding one of the multiple pairs of source/bit lines by an isolation structure made of a dielectric material.

3. The ferroelectric memory device as claimed in claim 2, wherein, in the corresponding one of the multiple pairs of source/bit lines, the one of the source/bit lines connected to the each of the plurality of carrier structures is a source line.

4. The ferroelectric memory device as claimed in claim 2, wherein, in the corresponding one of the multiple pairs of source/bit lines, the one of the source/bit lines connected to the each of the plurality of carrier structures is a bit line.

5. The ferroelectric memory device as claimed in claim 1, wherein the ferroelectric memory device is an n-type semiconductor device, and the plurality of carrier structures include NiO, $Cu_2O$, $CuAlO_2$, $CuGaO_2$, $CuInO_2$, $SrCu_2O_2$, SnO, or p-type silicon.

6. The ferroelectric memory device as claimed in claim 1, wherein the ferroelectric memory device is a p-type semiconductor device, and the plurality of carrier structures include IGZO, ZnO, $In_2O_3$, $SnO_2$, or n-type silicon.

7. The ferroelectric memory device as claimed in claim 1, wherein, for each pair of the multiple pairs of source/bit lines, each of the source/bit lines is connected to a corresponding one of the plurality of carrier structures.

8. The ferroelectric memory device as claimed in claim 7, wherein, for each pair of the multiple pairs of source/bit lines, two of the plurality of carrier structures, which are respectively connected to the source/bit lines, have different values of thickness.

9. A ferroelectric memory device comprising:
a stack structure including two columns each including a plurality of dielectric layers and a plurality of conductive layers that are alternatingly stacked;
two spaced-apart memory segments that are respectively connected to side walls of the two columns;
two spaced-apart channel portions that are respectively connected to the two spaced-apart memory segments;
two spaced-apart source/bit lines that are connected between the two spaced-apart channel portions; and
at least one carrier structure that is connected to at least one of the two spaced-apart source/bit lines,
wherein each of the two spaced-apart channel portions is disposed between and interfaces each of the two spaced-apart source/bit lines and a corresponding one of the two spaced-apart memory segments.

10. The ferroelectric memory device as claimed in claim 9, wherein the at least one carrier structure is connected to one of the two spaced-apart source/bit lines and is separated from the other one of the two spaced-apart source/bit lines by an isolation structure made of a dielectric material.

11. The ferroelectric memory device as claimed in claim 10, wherein the one of the two spaced-apart source/bit lines connected to the at least one carrier structure is a source line.

12. The ferroelectric memory device as claimed in claim 10, wherein the one of the two spaced-apart source/bit lines connected to the at least one carrier structure is a bit line.

13. The ferroelectric memory device as claimed in claim 9, wherein the at least one carrier structure includes NiO, $Cu_2O$, $CuAlO_2$, $CuGaO_2$, $CuInO_2$, $SrCu_2O_2$, SnO, IGZO, ZnO, $In_2O_3$, $SnO_2$, or doped silicon.

14. The ferroelectric memory device as claimed in claim 9, wherein the two spaced-apart memory segments are made of a ferroelectric material.

15. The ferroelectric memory device as claimed in claim 9, wherein the at least one carrier structure includes two carrier structures that are respectively connected to the two spaced-apart source/bit lines.

16. The ferroelectric memory device as claimed in claim 15, wherein the two carrier structures have different values of thickness.

17. A ferroelectric memory device comprising:
a semiconductor substrate;
a stack structure disposed over the semiconductor substrate, and including two columns each including a plurality of dielectric layers and a plurality of conductive layers that are alternatingly stacked;
two spaced-apart memory segments that are respectively connected to side walls of the two columns;
two spaced-apart channel portions that are respectively connected to the two spaced-apart memory segments;
two spaced-apart source/bit lines that are sandwiched between and in contact with the two spaced-apart channel portions; and
a first carrier structure that is connected to at least one of the two spaced-apart source/bit lines.

18. The ferroelectric memory device as claimed in claim 17, wherein
the first carrier structure is connected to one of the two spaced-apart source/bit lines; and
the ferroelectric memory device further comprises a second carrier structure connected to the other one of the two spaced-apart source/bit lines.

19. The ferroelectric memory device as claimed in claim 18, further comprising an isolation structure made of a dielectric material, wherein the first carrier structure is spaced apart from the second carrier structure by the isolation structure.

20. The ferroelectric memory device as claimed in claim 19, wherein the isolation structure, the first carrier structure, the second carrier structure, and the two spaced-apart source/bit lines are connected between the two spaced-apart channel portions.

\* \* \* \* \*